(12) United States Patent
Sugar et al.

(10) Patent No.: US 7,050,452 B2
(45) Date of Patent: May 23, 2006

(54) SYSTEMS AND METHODS FOR INTERFERENCE MITIGATION AMONG MULTIPLE WLAN PROTOCOLS

(75) Inventors: Gary L. Sugar, Rockville, MD (US); William R. Seed, N. Potomac, MD (US); Yohannes Tesfai, Falls Church, VA (US)

(73) Assignee: Cognio, Inc., Germantown, MD (US)

( * ) Notice: Subject to any disclaimer, the term of this patent is extended or adjusted under 35 U.S.C. 154(b) by 910 days.

(21) Appl. No.: 09/970,846

(22) Filed: Oct. 5, 2001

(65) Prior Publication Data

US 2002/0061031 A1 May 23, 2002

Related U.S. Application Data

(60) Provisional application No. 60/238,761, filed on Oct. 6, 2000.

(51) Int. Cl.
*H04J 3/16* (2006.01)
*H04J 3/22* (2006.01)

(52) U.S. Cl. ............... 370/465; 370/208; 370/328; 370/337; 370/338; 370/468; 370/479; 455/3.01; 455/3.05; 455/407; 455/408; 455/426.1; 455/433

(58) Field of Classification Search ........ 370/208–210, 370/328–338, 347, 465, 468, 477, 479, 498, 370/509; 375/260, 364; 455/3.01, 3.05, 455/407, 408, 426.1, 426, 433, 553.1
See application file for complete search history.

(56) References Cited

U.S. PATENT DOCUMENTS

| 5,231,634 | A | 7/1993 | Giles et al. | |
|---|---|---|---|---|
| 5,428,819 | A | 6/1995 | Wang | |
| 5,574,979 | A | 11/1996 | West | |
| 5,732,077 | A | 3/1998 | Whitehead | 370/349 |
| 5,828,660 | A * | 10/1998 | Baum et al. | 370/330 |
| 5,844,900 | A | 12/1998 | Hong et al. | |
| 5,844,905 | A | 12/1998 | McKay et al. | |
| 5,889,772 | A | 3/1999 | Fischer et al. | |
| 6,011,784 | A | 1/2000 | Brown | |
| 6,061,343 | A | 5/2000 | son Åkerberg | |
| 6,173,189 | B1 | 1/2001 | Lockhart | |
| 6,240,083 | B1 | 5/2001 | Wright et al. | |
| 6,256,478 | B1 | 7/2001 | Allen et al. | |
| 6,278,697 | B1 | 8/2001 | Brody | |
| 6,292,508 | B1 | 9/2001 | Hong et al. | |
| 6,295,461 | B1 | 9/2001 | Palmer et al. | |

(Continued)

FOREIGN PATENT DOCUMENTS

WO    WO0124455 A1    4/2001

(Continued)

OTHER PUBLICATIONS

US 5,292,508, Mar. 1994, Hong et al. (withdrawn).

(Continued)

*Primary Examiner*—Wellington Chin
*Assistant Examiner*—Raj Jain
(74) *Attorney, Agent, or Firm*—Edell, Shapiro & Finnan, LLC

(57) ABSTRACT

Interference mitigation or collision avoidance systems and procedures to allow different wireless local area network (WLAN) communication protocols to co-exist in the same frequency band, such as an unlicensed frequency band used for short-range wireless communications. The procedures ensure substantial throughput of information carried by signals of each WLAN protocol while preventing collisions between signals of different protocols.

132 Claims, 22 Drawing Sheets

U.S. PATENT DOCUMENTS

| | | | |
|---|---|---|---|
| 6,349,198 B1 | 2/2002 | Carlson et al. | |
| 6,374,082 B1 | 4/2002 | Carlson | |
| 6,377,782 B1* | 4/2002 | Bishop et al. | 455/3.01 |
| 6,563,880 B1* | 5/2003 | Hunsinger et al. | 375/260 |
| 2001/0010689 A1 | 8/2001 | Awater et al. | |

FOREIGN PATENT DOCUMENTS

| | | |
|---|---|---|
| WO | WO0124456 A1 | 4/2001 |
| WO | WO0124457 A1 | 4/2001 |
| WO | WO0124458 A1 | 4/2001 |
| WO | WO0124454 A1 | 5/2001 |
| WO | WO0135540 A2 | 5/2001 |
| WO | WO0135578 A1 | 5/2001 |

OTHER PUBLICATIONS

Jim Zyren, Extension of Bluetooth and 802.11 Direct Sequence Interference Model, IEEE 802.11-98/378, Harris Semiconductor, Nov. 1998.

Carlos Rios, A Proposal for 802.11b and Bluetooth Coexistence in Enterprise Environments, IEEE 802.15-091r0, Sep. 1999.

Todor Cooklev, Towards Coexistence Among Wireless Devices, IEEE P802.15 Wireless Personal Area Networks, Aware, Jan. 2000.

Tod Sizer, Bluetooth SIG Coexistence Working Group, IEEE 802.15, Lucent Technologies, Bell Laboratories, Nov. 2000.

International Preliminary Examination Report in counterpart International Application No. PCT/US01/31147, dated Sep. 22, 2003.

Written Opinion dated Nov. 27, 2002 in counterpart PCT Application, PCT/US01/31147.

TrueRadio, Enabling Wi-Fi and Bluetooth Coexistence without Comprise, Mobilian True Connectivity.

* cited by examiner

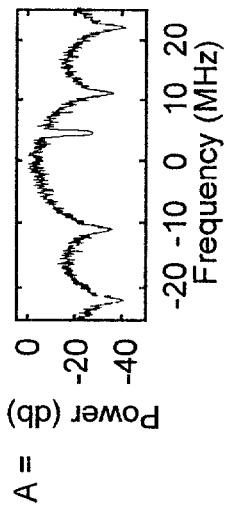
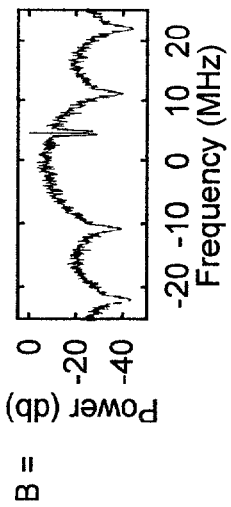
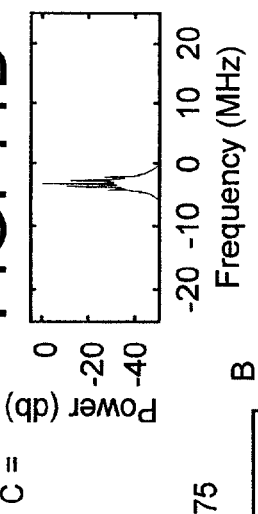
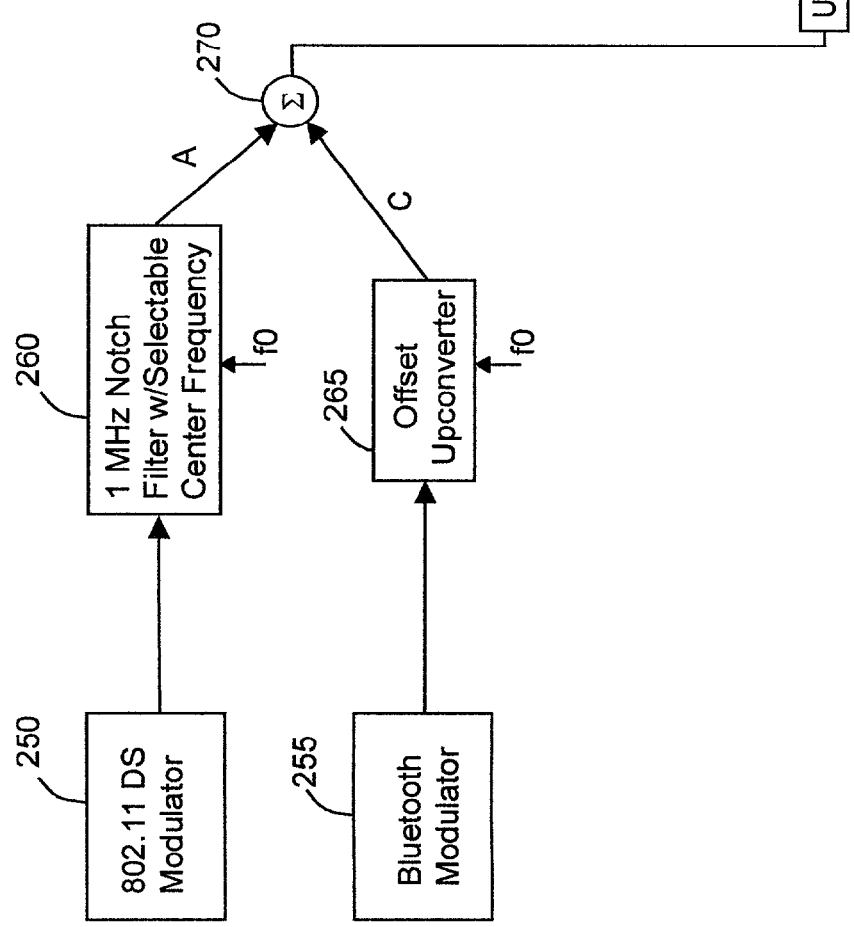

SYSTEMS AND METHODS FOR INTERFERENCE MITIGATION AMONG MULTIPLE WLAN PROTOCOLS

This application claims priority to U.S. Provisional Application No. 60/238,761 filed Oct. 6, 2000, the entirety of which is incorporated herein by reference.

BACKGROUND OF THE INVENTION

The present invention is directed to systems and methods for preventing the collisions or interference between signals from different wireless local area network (WLAN) and wireless personal area network (WPAN) communication protocols that coexist in the same frequency band. The term WLAN is used to refer to a class of wireless communication technology that operates at a distance up to 100 meters, and AWPAN is commonly used to refer to a class of wireless communication technology that operates up to a distance of 10 meters. For simplicity, when used herein, the term WLAN is meant to encompass WLAN as well as WPAN technologies, and any other shorter-range wireless communication technology, particularly, but not limited to, those that do not require a license for operation by the Federal Communications Commission in the United States and other similar unlicensed bands outside of the U.S.

The existence and popularity of new WLAN communication protocols results in several protocols sharing the same frequency spectrum. This causes an interference problem affecting throughput and reliability in wireless networks.

|  | IEEE 802.11b | Bluetooth ™ | HomeRF |
| --- | --- | --- | --- |
| Market Focus | Enterprise WLAN, school, home | Wireless cable | Home WLAN |
| Devices Likely to Use this Tech. | Laptop, desktop PCs | Palmtops, cell-phones, MP3 players | Home desktop PCs, printers, cordless phones |
| Technology | 2.4 GHz ISM, DSSS | 2.4 GHz ISM, FH | 2.4 GHz ISM, FH |
| Peak Data Rate | 11 Mbps | 721 kbps | 1.6 Mbps |
| Range | 50 m | 10 m | 50 m |
| Transmit Power | 20 dbm | 0 dbm | 20 dbm |

In the U.S. alone, for example, three popular WLAN technologies exist which share the 2.4 GHz unlicensed ISM band (see table above). As it turns out, each technology has merits relative to the other and, as a result, has secured itself as a preferred technology in at least one important market segment. Bluetooth™, for example, has proven to be the leading WLAN technology for low-cost mobile computing devices such as palm-top computers, cell-phones, and MP3 audio players. On the other hand, because of its support for 10 Mbps data rates, IEEE 802.11b appears to be preferred for laptop computers in the enterprise and home environments.

The lack of a dominant WLAN technology means that different device types may use multiple WLAN technologies at the same time in the same place. For example, in the residence, IEEE 802.11b and/or HomeRF may be used for wireless computer networking, and Bluetooth may be preferred for games, MP3 players and palmtop computers. In the enterprise environment, 802.11b may be used for wireless computer networking (laptops and/or desktop computers), and Bluetooth may be used for palmtop computers and cell-phones.

Unfortunately, although each of these technologies was designed to work reliably with some interference in the ISM band, they were not designed to coexist with each other. The resulting interference between the WLAN technologies degrades system throughput and compromises the overall reliability of each of the wireless networks. This is a well-known and well-documented problem.

SUMMARY OF THE INVENTION

The systems and methods of the present invention provide interference mitigation algorithms which allow for the operation of multiple wireless communication protocols in a common frequency band, particularly an unlicensed frequency band allocated for short-range wireless communication. The systems and methods according to the present invention have utility in WLANs where there is possible overlap in frequency and time of signals transmitted in a common frequency band. In some cases, there is a signal of one communication protocol that is of a fixed frequency nature (at least one or more fixed frequencies) in the frequency band concurrent with a signal of another communication protocol that hops to different, but predictable, frequencies. It is also possible that there are signals of a frequency hopping nature of the same type of communication protocol present in the frequency band, for example, two Bluetooth networks operating in the same frequency band. In general, the system and methods of the present invention are useful in WLANs that have one or more frequency hopping communication protocols coexisting with one or more fixed frequency communication protocols in a frequency band, and WLANs that have two or more frequency hopping signals of the same or different type coexisting in a frequency band. Collisions of signals in the frequency band that would otherwise naturally occur among the devices are minimized or avoided while optimizing throughput of information.

Other objects and advantages of the present invention will become more readily apparent when reference is made to the following description in conjunction with the accompanying drawings.

BRIEF DESCRIPTION OF THE DRAWINGS

FIG. 11A is a block diagram showing a configuration in an MPD suitable for simultaneous downlink of information using the frequency hopping communication protocol, such as Bluetooth™ and fixed frequency communication protocol, such as IEEE 802.11 in the same frequency band.

FIGS. 11B, 11C and 11D are spectrum diagrams of various signal points in the block diagram of FIG. 11A.

DETAILED DESCRIPTION OF THE INVENTION

1. General Description of Interference Mitigation Procedures

The present invention enables an improvement in the operation of two or more dissimilar wireless local area network (WLAN) communication protocols or technologies that operate in the same frequency band. For purposes of understanding the present invention, several terms will be introduced and explained. The term "node" will be used throughout. A node refers to a wireless communication device that is a point on a network, such as a WLAN. A "hub" node is a node that distributes information to (as well as receives information from) other nodes and may also be connected to another network, such as a wired network. A "terminal" node is a node that communicates with a hub node or other non-hub nodes, and is not connected to another network.

A multi-protocol wireless communication device (MPD) is a device which acts as a node (hub or terminal) on two or more wireless local or personal area networks, simultaneously. An example of an MPD is device that operates simultaneously as a hub with respect to communication protocols A and B in communicating with terminal nodes. Some terminal nodes that communicate with this MPD may use only protocol A and others may use only protocol B, while still others may use protocol A and/or B. Generally, the devices that operate using communication protocol A form one wireless communication network, and the devices that operate using communication protocol B form another wireless communication network. Another example of an MPD is a laptop computer augmented with the appropriate hardware and/or software to act as a terminal node with respect protocol A and simultaneously as a hub node with respect to protocol B. Still another example of an MPD is a device that simultaneously operates as a terminal node for protocol A and a terminal node for protocol B. The interference avoidance algorithms described herein are useful in the MPD. Finally, it should be understood that the interference avoidance algorithms of the present invention may also be useful to manage communication of two or more networks operating with the same communication protocol in the same frequency band, particularly where a characteristic of the protocol (frequency hopping) necessitates collision avoidance procedures to optimize throughput on each network.

The terms "downlink" and "uplink" are used in the foregoing description. Transmission from the hub node to a terminal node is referred to as a "downlink" and communication from a terminal node to a hub node is referred to as an "uplink." Transmission directly between terminal nodes is called peer-to-peer communication.

A terminal node may have a particular name or identifier for different communication protocols. For example, a BT terminal node is called a slave and a 802.11 terminal node is called a station (STA). A BT hub node is called a master. An 802.11 hub node is called an access point (AP).

Figure 1:
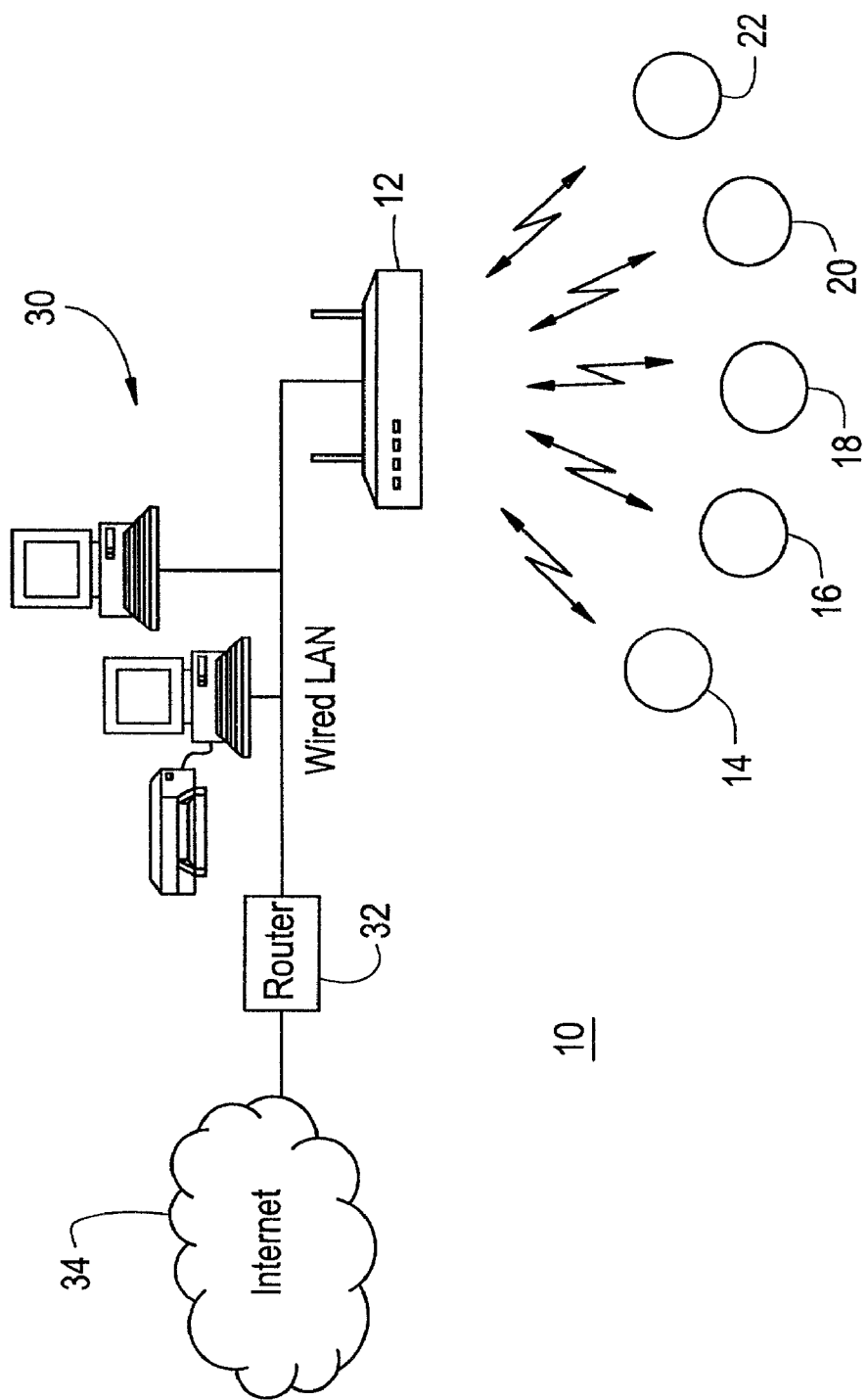
FIG. 1 is a block diagram of a multi-protocol communication environment according to the present invention.

FIG. 1 shows an example of a system 10 according to the invention in which an MPD 12 communicates with terminal nodes 14, 16, 18, 20 and 22. Terminal nodes 14 and 22 are wireless communication devices that, for example, operate using a first communication protocol, such as 802.11. Terminal nodes 16 and 20 are wireless communication devices that, for example, operate using a second communication protocol, such as Bluetooth. Terminal node 18 is a wireless communication device that, for example, operates using a third communication protocol, such as HomeRF. The MPD 12 is shown to be connected to a wired network 30, which in turn may be connected to a router 32 and to the Internet 34.

Figure 2:
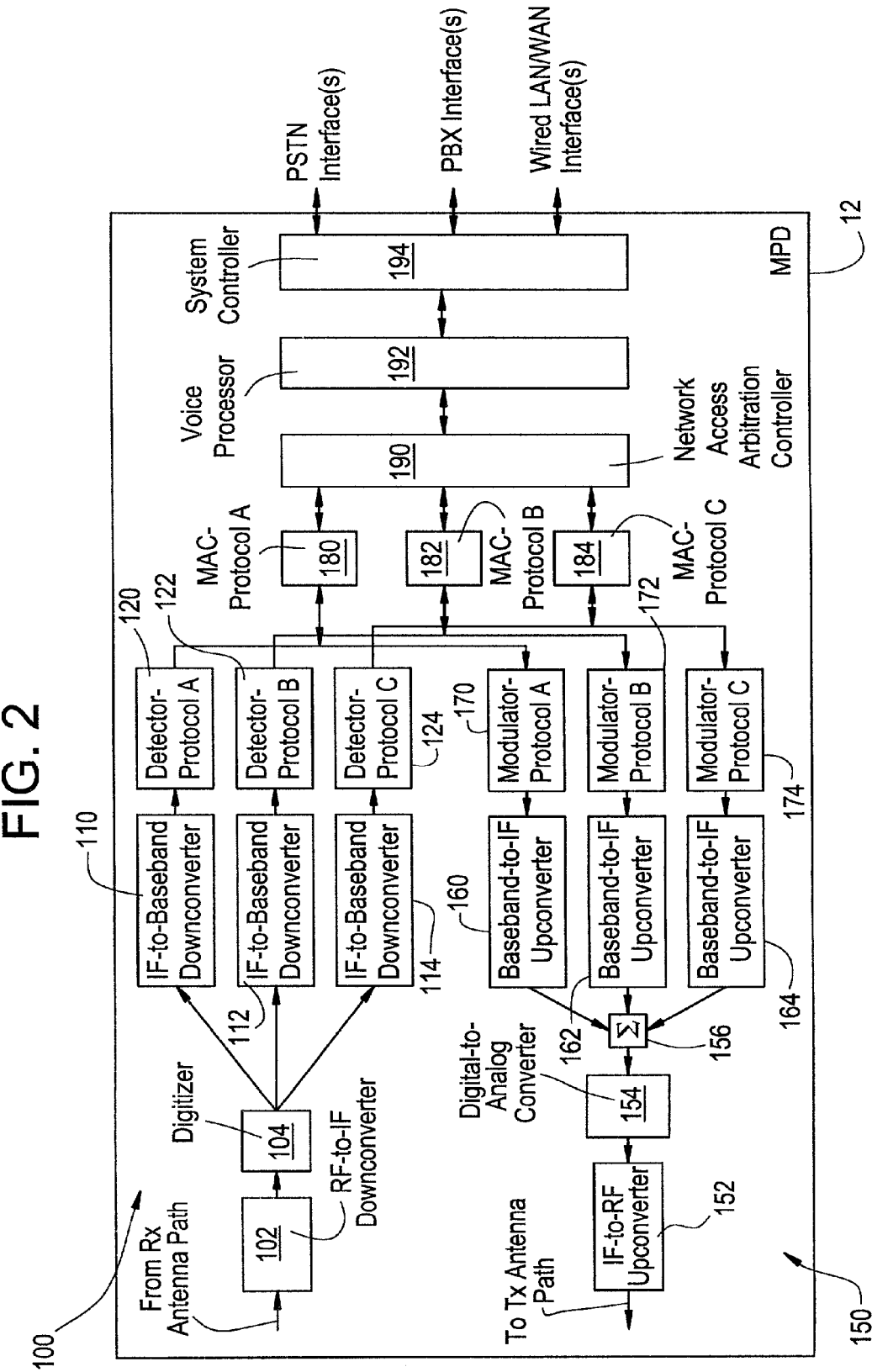
FIG. 2 is a block diagram showing an internal architecture suitable for a multi-protocol wireless communication device (MPD) according to the present invention.

FIG. 2 shows an example of an internal architecture for an MPD device useful according to the invention.

The MPD 12 comprises a receive channel section 100, a transmit channel section 150, MAC layer protocol processors 180, 182 and 184, a network access arbitration controller 190, a voice processor 192 and a system controller 194. The receive channel section 100 comprises an RF-to-IF downconverter 102 which is coupled to a receive antenna, a digitizer 104 coupled to the downconverter 102, a plurality of IF-to-baseband downconverters 110, 112 and 114 each associated with a particular communication protocol, and a plurality of protocol detectors 120, 122, 124 each associated with a particular communication protocol.

In the transmit channel section 150, there is an IF-to-RF upconverter 152, a digital-to-analog converter 154, an adder 156, a plurality of baseband-to-IF upconverters 160, 162 and 164 each associated with a particular communication protocol and a plurality of modulators each 170, 172 and 174 each associated with a particular communication protocol. Thus, for each communication protocol, there is a detector in the receive channel section 100 that performs the decoding of the baseband digital signal according to the rules of that communication protocol, and in the transmit channel section 150, there is a modulator that performs the encoding of the baseband digital signal according to the rules of that communication protocol.

For each protocol, the MPD 12 has a MAC block 180, 182 and 184. A network access arbitration controller (NAAC) 190 is coupled to the MAC blocks 180, 182 and 184. A voice processor 192 is coupled to the NAAC 190 to process digital voice data. (A video processor or any other special application processor may also be included in the MPD 12 as would appreciated by those in the art.) A system controller 194 is coupled to the voice processor 194. The system controller 194 provides high level control functionality. For example, the system controller 194 can measure activity on one or more communication protocols in the network by monitoring signal energy in a frequency band of a particular or several communication protocols. Moreover, the system controller 194 can generate signals that represent a measure of a level of a signal. Many of the elements shown in FIG. 2, including the MAC blocks 180–184, voice processor 192, NAAC 190 and system controller 194 are software processes that are executed by one or more digital processing chips, either of an application specific variety or a general processing variety. The interference mitigation/collision avoidance procedures described herein are executed by the NAAC 190. However, it should be understood that other elements shown in FIG. 2 may share responsibility or perform the processes described herein. Moreover, the logic to perform the interference avoidance algorithms described herein can alternatively be embodied by one or more controllers configured or programmed (with software instructions or firmware), such as one or more general purpose processors or application specific integrated circuits (ASICs). Alternatively, the logic to perform the interference avoidance algorithms described herein can be embodied as a software product stored on a processor readable memory containing instructions that, when executed by a processor, cause the processor to perform the steps of the various algorithms described herein.

The precise location or component that performs the processes is not material to the invention. In some cases, such as the notch filtering procedures, the interference mitigation procedures involve tapping signals at the output of one or more other elements in the receive section 100 or transmit section 150. Depending on design considerations, some components or functions may be implemented with analog signal designs, such as the upconverters and downconverters. On the other hand, digital signal filtering techniques may be desirable, but not required, such as in the case of notch filtering procedures described hereinafter.

Figure 3:
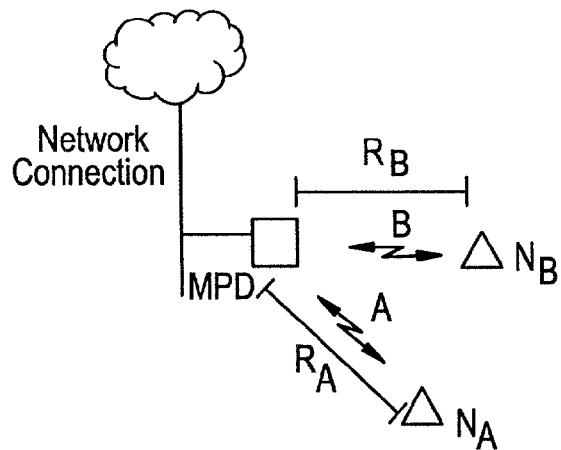
FIG. 3 is a diagram depicting communication between an MPD and terminal nodes in a WLAN using two different types of WLAN communication protocols or technologies, referred to as A and B.

With reference to the configuration shown in FIG. 3 in which an MPD communicates with node A ($N_A$) and node B ($N_B$). $N_A$ and $N_B$ use WLAN technologies (wireless communication protocols) A and B, respectively. $N_A$ is located a distance of $R_A$ from the MPD; $N_B$ is located a distance of $R_B$ from the MPD. The MPD is shown in the FIG. 3 to be connected to a wired network. In this example, the MPD is acting as a hub node with respect to protocol A and a hub node with respect to protocol B in the same frequency band.

Figure 4:
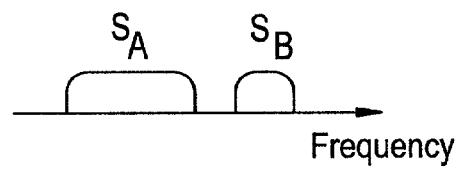
FIG. 4 is a frequency spectrum diagram for a multi-mode WLAN in which two different WLAN communication protocols operate in the same frequency band.

Without loss of generality, the spectrum of wireless communication protocol A is assumed to occupy a greater bandwidth than that used by wireless communication protocol B, as shown in FIG. 4. The transmit power of protocol signal A and protocol signal B may also be different. Protocol signals A and/or B may be frequency-hopped throughout their allocated frequency band, and occasionally overlap in frequency.

Figure 5A:
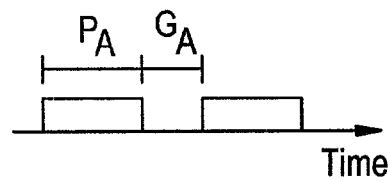
FIGS. 5A and 5B are timing diagrams showing basic time-division duplex formats for each WLAN communication protocol.
Figure 5B:
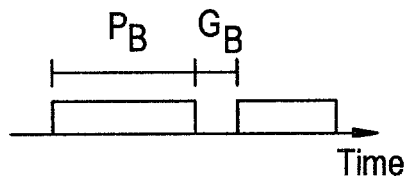

Protocols A and B are further assumed to use a Time-Division Duplex (TDD) format, which typically results in a half-duplex mode of operation for each between the MPD and its nodes. As shown in FIGS. 5A and 5B, the nominal packet duration for communication protocol A is $P_A$. The minimum time between transmissions is $G_A$. Similarly, the nominal packet duration for WLAN technology B is $P_B$, and the minimum time between transmissions is $G_B$.

Figure 6:
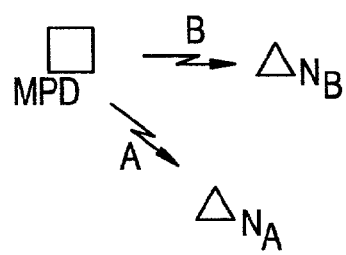
FIG. 6 is a diagram showing concurrent transmission of information from an MPD (downlink) on each of two WLAN communication protocols to two separate terminals in the same frequency band.
Figure 7:
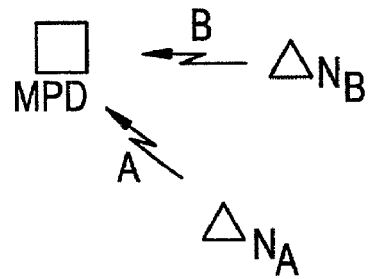
FIG. 7 is a diagram showing concurrent reception of information at the MPD (uplink) from two separate terminals on each of two WLAN communication protocols in the same frequency band.
Figure 8:
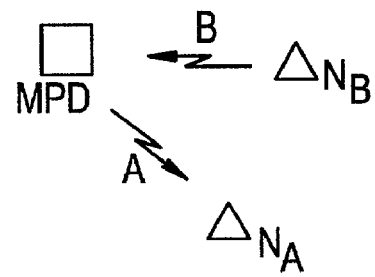
FIG. 8 is a diagram showing transmission from the MPD to a terminal (downlink) on one communication protocol concurrent with reception at the MPD from another terminal (uplink) on another communication protocol in the same frequency band.

Interference occurs when two or more communication protocol signals overlap in time and frequency. The term collision is often used to describe the case where two or more signals attempt to occupy a common medium at the same time. As shown in FIGS. 6, 7 and 8 there are 3 general types of interference problems. (1) Downlink A-Downlink B (FIG. 6) occurs when the MPD wishes to transmit to $N_A$ and $N_B$ at the same time and protocol signals A and B at least partially overlap in spectrum. (2) Uplink A-Uplink B (FIG. 7) occurs when the MPD wishes to receive signals from $N_A$ and $N_B$, where protocol signals A and B at least partially overlap in spectrum. (3) Downlink A-Uplink B (FIG. 8) occurs when the MPD wishes to transmit a signal to $N_A$ while receiving a signal from $N_B$, where both transmit and receive signals at least partially overlap in spectrum. A fourth case, Downlink B-Uplink A, is similar to (3).

1.1 Downlink A-Downlink B

Figure 9:
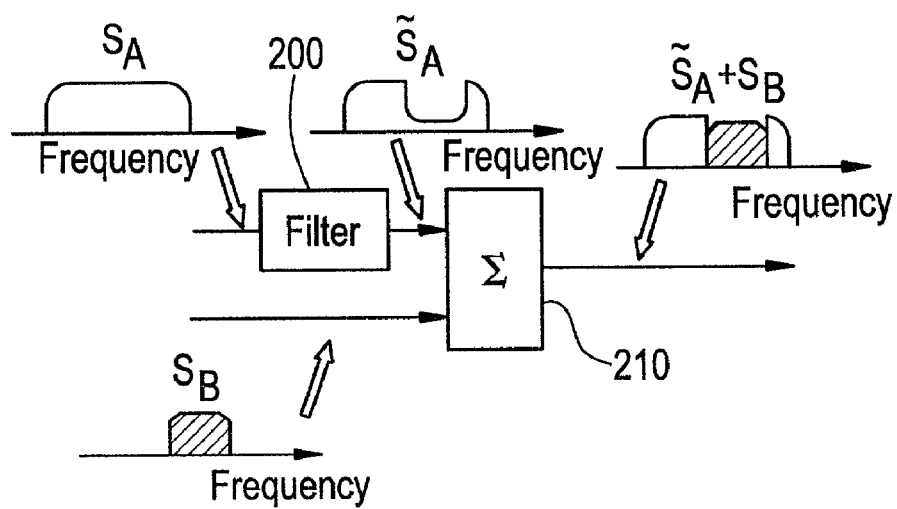
FIG. 9 is a flow diagram showing a notch filtering technique to support simultaneous downlink of information on each of two different communication protocols in the same frequency band.

When the spectrum of transmitted protocol signals A and B are non-overlapping, the MPD can deliver downlink protocol signals A and B to $N_A$ and $N_B$, respectively, with no interference. When the spectrum of protocol signal A overlaps with that of B, conventional transmission techniques in which protocol signals A and B are transmitted without regard for the other will result in interference to both systems. With reference to FIG. 9, one method of communications that maximizes aggregate downlink throughput is to apply a notch filter 200 to the wider bandwidth protocol signal A to first remove the spectral energy of protocol signal A that overlaps with protocol signal B. The filtered signal A is then summed by an adder 210 with protocol signal B and transmitted to $N_A$ and $N_B$.

A distortion will be introduced to protocol signal A when it is passed through a notch filter. $N_A$ ideally uses a similar, matched filter to recover protocol signal A. $N_A$ may apply a notch filter if $N_A$ determines that an interfering signal occupies a portion of the spectrum used by protocol signal A, or if $N_A$ is directed to do so by the MPD. If $N_A$ is unable to provide a similar notch filter to its receive signal, the degree of distortion that may be tolerated without affecting link throughput will be dependent on the relative bandwidths of protocol signals A and B, and the robustness of the modulation of protocol signal A and error correction parameters.

If the spectral width of protocol signal A is comparable to protocol signal B, such that reliable communications cannot be achieved while simultaneously transmitting protocol signal B and protocol signal A, where signal A has been notch filtered as described above, the MPD should transmit exclusively only protocol signal A or protocol signal B. The choice of which WLAN to transmit may be determined by establishing a priority for different WLAN networks or for the type of data or channel that is to be carried on the WLAN. For example, voice and video communications, which are often carried on synchronous channels, are typically more sensitive to added latency than data communications. Voice and video channels would therefore normally be given a higher priority than given for a data exchange.

1.2 Uplink A-Uplink B

When the spectrum of transmitted protocol signals A and B are non-overlapping, the MPD will be able to receive signals A and B from $N_A$ and $N_B$, respectively, with no interference. When the spectrum of protocol signal A overlaps with that of B, the two signals will interfere with each other and may lead to incorrect decoding at the MPD of both signals. An improved method of communications is to have the MPD keep such a situation from occurring by exploiting Medium Access Control (MAC) properties typically available with short range wireless communications systems to effectively hold-off or delay $N_A$ or $N_B$ from transmitting, as described below.

A master-slave configuration is often used in wireless networks to provide explicit control of when a node may transmit. The master typically must provide explicit instruction to a slave before it may transmit data. If the MAC for protocol signal A or protocol signal B uses a master-slave configuration, and the MPD is the master, and the MPD can delay $N_A$ or $N_B$ from transmitting its uplink signal until after the collision period.

Figure 10:
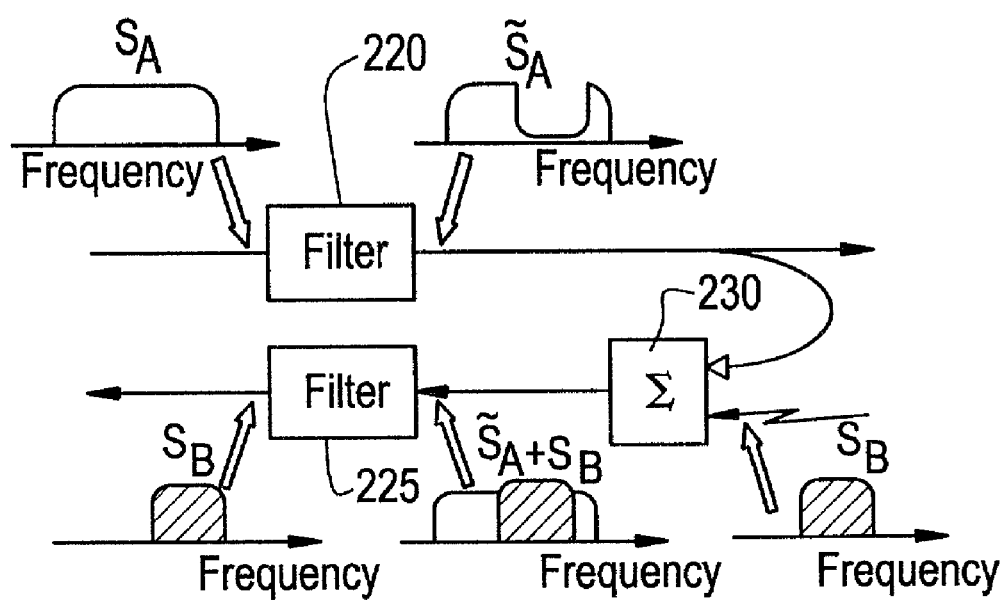
FIG. 10 is a flow diagram showing a notch filtering technique to support simultaneous downlink of information on one communication protocol and uplink on another communication protocol in the same frequency band.

Carrier Sense Multiple Access (CSMA) is often used to arbitrate wireless network access by having nodes first determine that the wireless network is inactive before transmitting. If protocol signals A or B use CSMA, the MPD may transmit a downlink signal prior to the period of temporal and spectral overlap to keep other nodes in the network from transmitting. This technique is particularly useful in protecting packets delivered over isochronous channels that do not typically allow retransmission. The MPD preferably transmits useful data on the downlink to one or more nodes operating over A, for example, while protecting an uplink transmission of protocol signal B in this case. In the event that the MPD has no useful data to transmit to $N_A$, the MPD creates a dummy packet that contains no useful data for its nodes, but serves the purpose of keeping $N_A$ from transmitting an uplink signal. For the case shown in FIG. 10 in which protocol signal A is transmitted by the MPD to keep node $N_A$ from transmitting, a notch filter 220 is applied to the wideband signal A before it is transmitted to reduce the interference at the receiver of the MPD. For a TDD system, a portion of the MPD transmit signal will be coupled into the MPD receive path. The MPD can remove this coupled downlink signal by using a bandpass filter 225 and an adder 230 to pass only the desired uplink signal.

1.3 Downlink A-Uplink B

When the spectrum of protocol signals A and B are non-overlapping, the MPD will be able to transmit signal A and receive signal B from $N_A$ and $N_B$, respectively, with no interference. When the spectrum of protocol signal A overlaps with that of B, the two signals will cause interference at the MPD and possibly at $N_A$ as well. A method which improves the overall communications throughput is to delay or hold-off transmitting protocol signal A or B. A method that achieves still higher communications throughput is to apply a frequency notch on protocol signal A that corresponds to the bandwidth of protocol signal B, similar to that shown in FIG. 10.

1.4 Additional Collision Avoidance Techniques

Because wireless links may at times have a relatively high Bit Error Rate (BER) due to interference or low signal power, explicit acknowledgment (ACK) of the correct decoding of a data packet is often used as a mechanism to efficiently trigger a retransmission. For communication protocols that use an ACK as part of the communications handshake protocol, it becomes necessary to determine if there is a potential collision on the data transfer and the ACK. As an example, consider a data transfer over protocol A that includes the use of ACK in its protocol. Also consider that A and/or B is frequency-hopped throughout similar bands as described above. To ensure that the data exchange between the MPD and $N_A$ is completed without interference, the techniques described above must be applied for both the data transfer and the ACK.

A technique referred to as polling may be used in a WLAN to enable contention-free data transfer. A slave node may only transmit after it has been polled by the MPD, which is assumed to be the WLAN master. The MPD may therefore use the poll as a mechanism to avoid collisions with other WLAN technologies. The MPD may also use polling with a combination of the above techniques, such as the use of a frequency notch when the MPD has two different overlapping WLAN signals to transmit.

A technique that can enable higher data throughput in a frequency-hopped WLAN is to extend the length of a transmission for a given hop, and enable data to be transmitted during what would otherwise be a guard time. A guard time of $G_B$ was earlier described with reference to FIGS. 5A and 5B. An additional benefit of extending a hop duration is to avoid hopping to a frequency which may interfere with a signal of another communication protocol. For example, if a protocol permits extending the hop duration to 5 hops, and hop 3 would be in the same band as another protocol signal, then the selection of a 5 hop transmission enables interference-free communications of data equal to 5 hops in duration. The same argument may be applied for a protocol that uses an ACK as part of its protocol; an extended hop duration is desirable if it enables both the forward channel or transmit signal and ACK to avoid interfering with another protocol signal.

The likelihood of two different protocol signals, such as A and B described above, interfering with each other is dependent on many factors. An important factor is the nominal network activity. If neither protocol A nor B are frequently active then the likelihood of interference between them is relatively small, and collision avoidance techniques may not be required. Conversely, if protocols A and B are relatively busy, there is a much higher likelihood that there will be significant interference then without the use of interference mitigation techniques may result in dramatic throughput reductions. The use of a metric that monitors WLAN activity can be used to determine if collision avoidance techniques should be deployed and if so, which ones to use. An additional metric that reflects the likelihood of a successful packet reception by a specific terminal may be used by the MPD to help determine whether a packet to that terminal should be transmitted during a period of potential interference.

A common technique to coordinate WLAN timing among multiple nodes is for the WLAN to use fixed duration slots, with an integral number of slots per frequency hop. For a situation in which an MPD operates 2 or more protocols that have a fixed slot structure, the MPD can enable further throughput enhancing techniques by time-aligning the signals of the protocols. Time-alignment of different protocol signals enables the MPD to efficiently determine potential collisions and to take action to mitigate such collisions.

A common technique deployed in WLAN protocols to enable random access of the WLAN medium is often referred to as Carrier Sense Multiple Access (CSMA) in which nodes first determine if the channel is unoccupied before transmitting. Nodes typically measure the power in the channel to determine whether the channel is already in use. If an MPD is operating 2 or more communication protocols that use CSMA to access the WLAN, and there are periods where 2 or more protocol signals that occupy the same band, the MPD may use the techniques described above to mitigate potential interference. The MPD may also collect WLAN traffic metrics to arbitrate WLAN access between different protocols to improve total WLAN throughput and to help minimize access delay time in which terminals are delayed from using the WLAN medium while it is being used by other nodes. For those cases in which multiple communication protocols operate from an MPD and concurrently offer periods of network access via CSMA, a method that enables these protocols to have comparable levels of success in accessing the network is to provide similar configurations of the CSMA parameters, such as packet duration, guard time and back-off time. An MPD that simultaneously supports channels that do not allow retransmission, such as for voice or video, over 2 or more communication protocol technologies can improve overall network throughput by adjusting the time at which packets are to be transmitted on both the uplink and downlink to the extent permitted in the nodes of the protocols, to minimize any overlap of such time-sensitive transmissions.

2. Interference Mitigation Algorithms As Applied To Specific WLAN Protocols 2.1 Operation For MPDs Supporting a Frequency Hopping Protocol, such as Bluetooth and a Fixed Frequency Protocol, such as 802.11b DS This section describes how the interference mitigation algorithm operates in networks supporting both Bluetooth (BT) and 802.11b DS(DS=Direct Sequence Spread Spectrum, 1–11 Mbps) protocols in the 2.4 GHz ISM band. Bluetooth is an example of a frequency hopping protocol and 802.11 is an example of a fixed frequency protocol, both existing in the same frequency band.

The algorithm described in this section assumes that at most one BT piconet (a TDMA connection between a master and up to 8 slaves) and at most one channel of 802.11b DS are managed simultaneously from the MPD. However, the techniques described herein can be used to support multiple 2 WLAN communication protocols of the same type, e.g., two or more Bluetooth networks and two or more 802.11 networks.

2.1.1 802.11 Operation

An IEEE 802.11 WLAN network uses a wireless Ethernet-like protocol to pass data among its nodes. There are different physical layer (PHY) protocols that support frequency-hopped (FH) and direct sequence (DS) spread spectrum modulation formats. The interference mitigation algorithm described in this chapter assumes that the DS format is always used (although it is rather straightforward to modify the algorithm to support FH format using similar techniques).

The DS system specified in 802.11b supports data rates of 1, 2, 5.5 and 11 Mbps. BPSK modulation is used to support the 1 and 5.5 Mbps data rates; QPSK is used to support 2 and 11 Mbps.

The master of the 802.11 network is called an access point (AP). The other nodes are referred to as stations (STAs). An AP may also take on the attributes of a STA by providing them access to a distribution system that connects multiple wired or wireless LANs.

The medium access layer (MAC) protocol uses Carrier Sense Multiple Access with Collision Avoidance (CSMA/CA) to arbitrate data transfers among the nodes. To transmit a packet on the 802.11 network, the sending node first listens for a carrier on the 802.11 channel to see if it is currently being used. If the sending node detects that the channel is idle for at least 1 DIFS interval (DIFS=Distributed Coordination Function Interframe Space), it transmits its data. Otherwise, if the channel is busy, the sending node generates a random number to be used as a backoff counter. The sending node periodically listens to the channel and decrements the backoff counter during polling intervals in which the channel is idle. After the backoff counter reaches zero, the sending node transmits its message.

After receiving and correctly decoding the message from the sending node, the receiving node waits one Short Interframe Space (SIFS) period from the end of the message before transmitting an ACK message. The sending node waits up to one ACK timeout period, after which it concludes that its message was lost and executes a random backoff interval procedure before attempting to transmit its message, as described above.

Further details about the IEEE 802.11 protocols are found in the published ANSI/IEEE specification documents, entitled "ANSI/IEEE Std 802.11: Wireless LAN Medium Access Control (MAC) and Physical Layer (PHY) Specifications," 1999 Edition, and subsequent versions thereof, which is incorporated herein by reference.

2.1.1.1 802.11 Network Configuration

In data only applications, the 802.11 network is generally configured to use large 802.11 fragment sizes (up to 1500 bytes) to achieve maximum system throughput. In combined voice/data applications, an MPD may generate control parameters to adjust the maximum fragment size of information transmitted by communication devices on the 802.11 network to minimize the required duration of a guard packet, which in turn minimizes the impact on throughput caused by the frequent deployment of 802.11 guard packets when synchronous type data on the Bluetooth network is to be transmitted. A description of guard packets is provided hereinafter.

2.1.1.2 Downlink of 802.11 Information

When the MPD has 802.11 downlink data to send, it transmits the data immediately using the rules described in the 802.11 MAC protocol. With reference to FIGS. 11A–11D, a configuration is shown in which there is a 802.11 modulator 250, a BT modulator 255, a notch filter 260, an offset upconverter 265, an adder 270 and an upconverter 275. If at any time during the transmission the MPD also needs to transmit a BT slot in the 802.11 band, it notches a 1 MHz segment out of the baseband 802.11 signal spectrum to accommodate the transmit BT signal, adds the BT signal at the frequency location of the notch, attenuates the BT signal by at least 10 dB (in power) relative to the 802.11 signal, and transmits the composite signal. If the BT transmission terminates before the end of the 802.11 transmission, the segment removed from the 802.11 signal is replaced by an allpass filter having the same group delay as the notch. This approach allows the MPD to transmit both BT and 802.11 signals simultaneously in the same frequency band with little or no performance impact.

Indeed, since the standard BT terminal includes a 1 MHz lowpass filter preceding its FM discriminator, the filter will remove energy outside of the notch filter passband from the 802.11 signal, thus ensuring reliable data recovery in the BT receiver. Also, although the notch filtering and the addition of the BT signal cause some intersymbol interference and distortion of the 802.11 signal, simulations using a practical implementation of the notch filter have shown that the signal-to-distortion ratio of the composite signal when sampled at mid-chip to be at least 10 dB, enabling reliable data recovery in the standard 802.11 receiver.

2.1.1.3 Uplink of 802.11 Information

The MPD usually acts like a typical 802.11 AP when receiving 802.11 uplink data. The only exception to this occurs when the MPD receives 802.11 uplink data while simultaneously transmitting a BT downlink packet in the same band (for example, when the MPD transmits a BT POLL packet in the 802.11 band while receiving an 802.11 ACK). The configuration shown in FIGS. 12A–12C comprises a BT modulator 280, an upconverter 285, a power amplifier 287, an adder 290, a downconverter 292, a notch filter 295 and an 802.11 detector 297. In order to receive the 802.11 data reliably, the MPD notches out the transmit BT signal from the received 802.11 signal using a 1 MHz notch filter. The notch is replaced by an allpass filter having the same group delay as the notch as soon as the BT transmission terminates.

2.1.2 Bluetooth Operation

Current versions of Bluetooth uses two-level FSK modulation at a data rate of 1 Mbps. The FSK carrier is frequency hopped 1600 times per second to minimize interference from other sources in the 2.4 GHz ISM band.

Each 625-microsecond dwell defines a BT timeslot. The master sends downlink data to the slaves in the even-numbered timeslots; uplink data is sent from the slaves to the master in the odd-numbered timeslots.

Each frequency-hopped BT channel is associated with a piconet. The master of the piconet provides the hop sequence and the hop clock through which the master and slaves communicate.

Two data links are defined in the BT protocol—the Synchronous Connection Oriented (SCO) and the Asynchronous Connectionless (ACL). The SCO link carries fall-duplex isochronous data such as digitized speech and/or video. SCO packets are single-slot packets and come in pairs—one packet for the downlink, the other for the uplink. SCO packets are never retransmitted.

The ACL link carries asynchronous data (e.g., for file transfers). ACL packets are 1, 3 or 5 slots in duration. A contention-free protocol is used to arbitrate ACL data transfers with a simple ACK/NACK retransmission scheme. The master polls each of the slaves for uplink data by sending a POLL packet in the appropriate timeslot. The slave addressed by the POLL packet responds with a 1,3, or 5-slot uplink ACL packet in the following timeslot. The master sends an ACK/NACK to the slave in the next timeslot in which it addresses that slave.

Further details on the Bluetooth communication protocol can be found in the published specification documents by the Bluetooth Special Interest Group (SIG), entitled "Specification of the Bluetooth System," Version 1.1, Feb. 22, 2001.

2.1.2.1 Bluetooth SCO Operation-Downlink and Uplink

This section describes how the MPD exchanges data with BT terminals using the SCO link. Although the SCO channel supports rate 2/3 and rate 1/3 FEC, interleaving is not supported, leaving the voice data vulnerable to bursts of bit errors whenever the BT hop frequency falls inside the 802.11 band. Consequently, in order to guarantee an acceptable level of voice quality in systems supporting both voice and data users, the MPD assigns a higher delivery priority to SCO packets than to ACL or 802.11 data.

Figure 13:
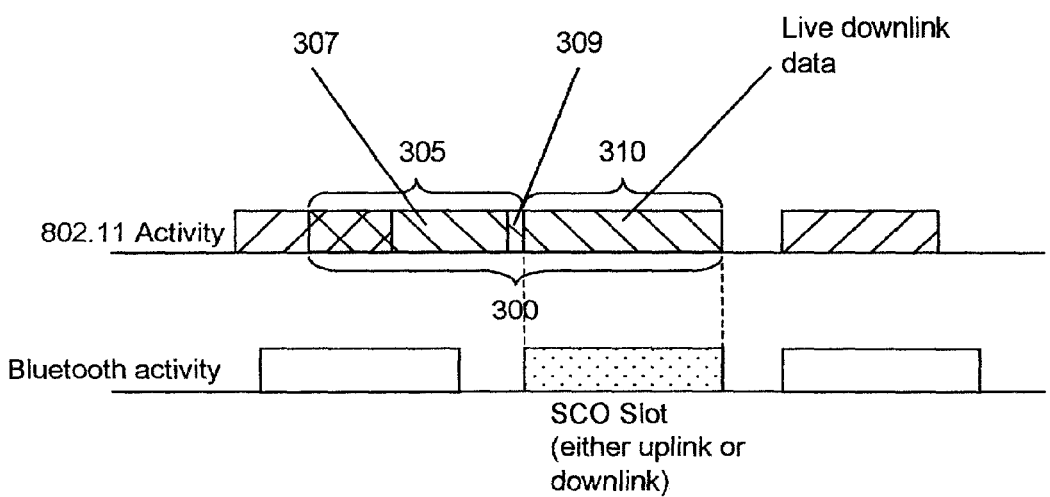
FIG. 13 is a timing diagram showing the use of a guard packet to manage communication of synchronous type data using a frequency hopping protocol in the same frequency band as a fixed frequency communication protocol.

With reference to FIG. 13, to guarantee reliable delivery of BT SCO data packets, the MPD transmits a "guard packet" on the 802.11 network immediately preceding the transmission of a BT SCO packet which falls inside the 802.11 band. The guard packet is an 802.11 message that alerts other 802.11 capable wireless communication devices in the frequency band not to transmit information, and thereby allows the MPD to effectively take control of the 802.11 link immediately preceding the transmission of the SCO packet in order to guarantee its reliable delivery.

As FIG. 13 shows, the guard packet 300 has a header 305 and a trailer 310. The header includes an all-zero data portion 307 (all-zero information bits spread using the 11-bit barker code) followed by a short duration identifier (DU-RID) message 309. The all-zero portion 307 applies energy to the 802.11 link for a period equal to the duration of one 802.11 fragment, plus an SIFS interval, plus the duration of an ACK message. This duration ensures that all 802.11 terminals will have stopped transmitting and entered the backoff state by the end of the all-zeros transmission. The DURID message 309 is a small data packet containing duration/id bit settings used to reserve the 802.11 bus for precisely the duration of the protected SCO packet.

The guard packet trailer 310 provides additional protection from 802.11 terminal transmissions during the SCO packet, and may also be used to carry live 802.11 downlink data if the MPD has transmit data waiting in its queues at the appropriate time. If the protected SCO packet is a downlink packet, the notch technique shown FIGS. 11A–11D is used to allow the MPD to transmit both the downlink SCO data and the 802.11 guard packet trailer in the 802.11 band at the same time.

A similar technique is used if the SCO packet resides in the uplink. In this case, the MPD notches a 1 MHz segment from the transmitted 802.11 signal in the guard packet trailer to accommodate the BT signal being received. This prevents the transmit signal energy from interfering with the BT signal at the BT receiver/detector input.

The implicit quality-of-service guarantee given to BT SCO voice channels over data channels comes at the expense of lower data throughput on the 802.11 network. The MPD network management software allows the network manager to limit the number of allowed voice channels to upper-bound the throughput impact. A provision is also made to dynamically adjust the maximum number of allowed voice channels in proportion to the data network loading measured by the MPD.

Figure 14:
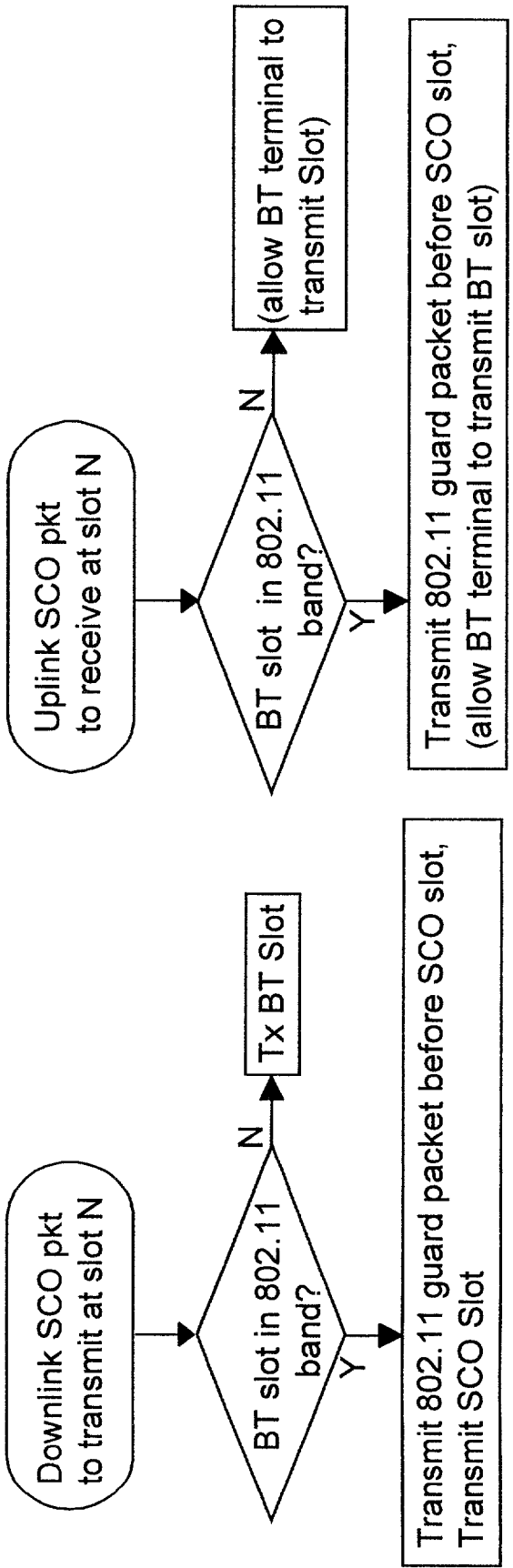
FIGS. 14A and 14B are flow diagrams showing a procedure for using the guard packet shown in FIG. 13 for downlink and uplink, respectively, of synchronous type data.

The flow charts of the procedures for processing BT SCO data in the MPD are shown in FIGS. 14A and 14B, respectively. As the figures show, guard packets are only used when the SCO packets fall inside the 802.11 band. If at any time during the transmission of a downlink SCO packet the MPD also needs to transmit a 802.11 message, it notches a 1 MHz segment out of the 802.11 signal spectrum to accommodate the transmit BT signal, as described above. The MPD replaces the notch with an allpass filter having the same group delay as the notch filter when either the 802.11 or BT transmission terminates.

Figure 15:
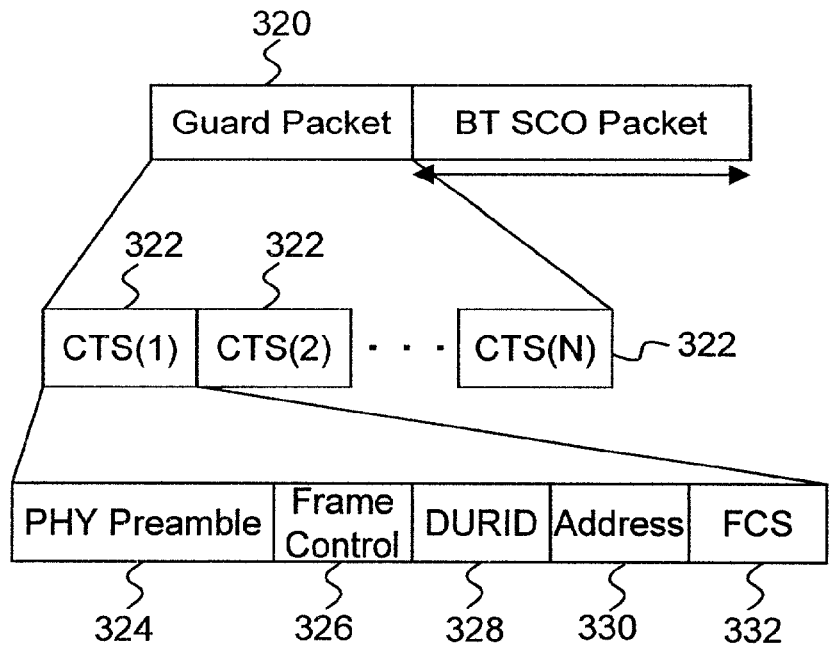
FIG. 15 is timing diagram for an alternative guard packet for wireless communication devices that function as access points.

FIG. 15 illustrates an alternative form of a guard packet, useful in an MPD that functions as an 802.11 AP and as either a Bluetooth master or a Bluetooth slave. The header portion of guard packet 320 comprises a sequence of N 802.11 clear-to-send (CTS) packets 322. Each CTS packet 322, CTS(N) comprises a preamble 324, a frame control field 326, a duration ID (DURID) field 328, an address field 330 and a frame check sequence (FCS) field 332. The CTS packets are understood by 802.11 capable devices to not access the medium for a period of time. The DURID field 328 for any CTS packet CTS(i) is set to a value of 366+(N−i)*L, where L is the duration in µs of a CTS packet. For example, L is 304 µs using standard PHY preamble, and 1 Mbps transmission rate. The duration of a BT SCO slot is 366 µs. The number N of CTS packets in a guard packet is equal to ceil(F/L)+1, where F is the fragment duration in Its at the lowest supported data rate, and L is defined above. Ceil (x) is a ceiling function meaning the smallest integer greater than (x). The fragment duration F is the longest transmit duration that a device can have on an 802.11 network. The theory or principle behind this alternative guard packet procedure is to guarantee that at least one CTS packet will be received by all of the 802.11 capable terminals by sending multiple packets over a time duration sufficient to extend longer than the longest transmission duration F that a device can have on the 802.11 network, regardless of the time alignment between the CTS packets and the other 802.11 transmission.

Figure 16:
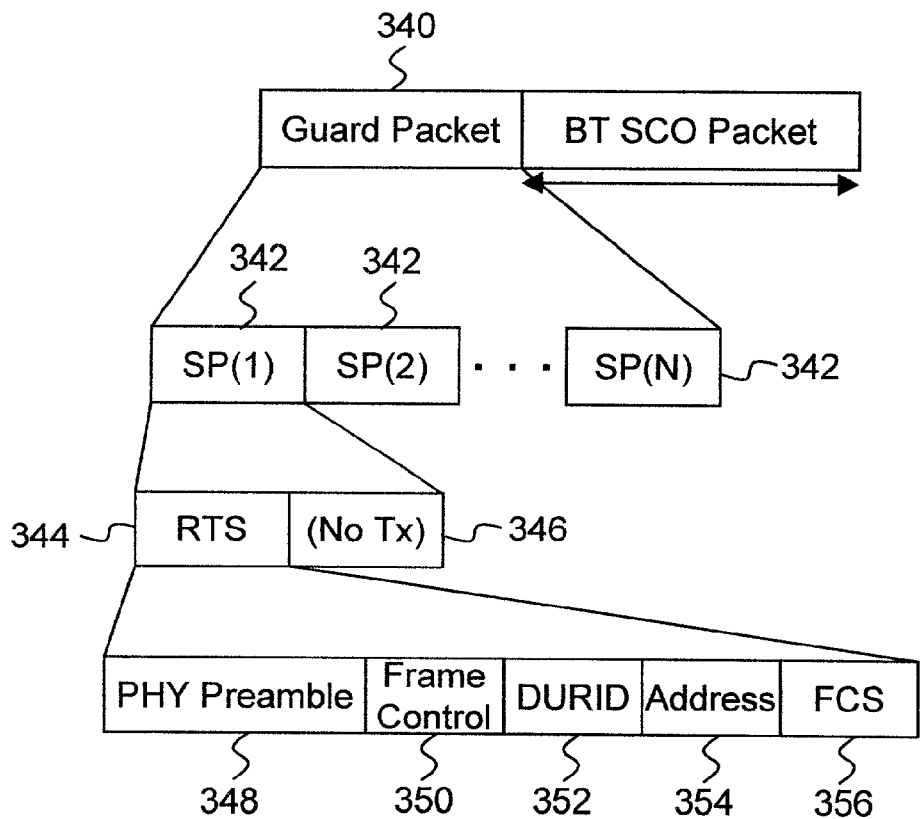
FIG. 16 is a timing diagram for a guard packet for wireless communication devices that function as terminals or stations.

FIG. 16 illustrates yet another form of a guard packet, particularly useful for an MPD that functions as an 802.11 STA and either a Bluetooth master or a Bluetooth slave. The header portion of guard packet 340 comprises a sequence of subpackets (SPs) 342. Each SP 342 comprises an 802.11 request-to-send (RTS) packet 344 and a "no-TX" or silent interval 346. Each RTS packet 344 comprises a PHY preamble 348, a frame control field 350, a DURID field 352 and an FCS field 356. An RTS packet is lower power than an CTS packet sent by an 802.11 AP. Like the procedure shown in FIG. 15, this procedure involves sending multiple RTS packets to guarantee that at least one RTS packet will be received by the 802.11 AP because several guard packets are sent for a time period that extends longer than the maximum 802.11 packet transmission permitted. When the 802.11 AP receives the RTS packet, it will, according to the 802.11 protocol, transmit a CTS packet in the frequency band with the proper parameters to reserve the medium for the 802.11 terminal node to receive or transmit the synchronous type data. The duration of the "no-TX" period is equal to the length of the SIFS plus the length of a CTS packet. The DURID field for RTS(i) packet is set to a value equal to 366+(N−I)*L+M, where L is the SP duration in µs, and M is the duration of a CTS packet plus an SIFS. The number N of SPs in a guard packet is equal to ceil(F/L)+1, where F is the fragment duration as described above in connection with FIG. 15.

2.1.2.2 Bluetooth ACL Operation

This section describes how the MPD exchanges data with BT terminals using the ACL link. In the description that follows, it is assumed, without loss of generality, that the MPD has at least 5 packets of data in its queue to be transmitted to a BT terminal, allowing the MPD to use 5-slot packets to achieve the highest throughput efficiency. If less than 5 packets of data are available, single or triple-slot packets are transmitted using the approach described below.

2.1.2.2.1 Bluetooth ACL Operation-Downlink

Figure 17A:
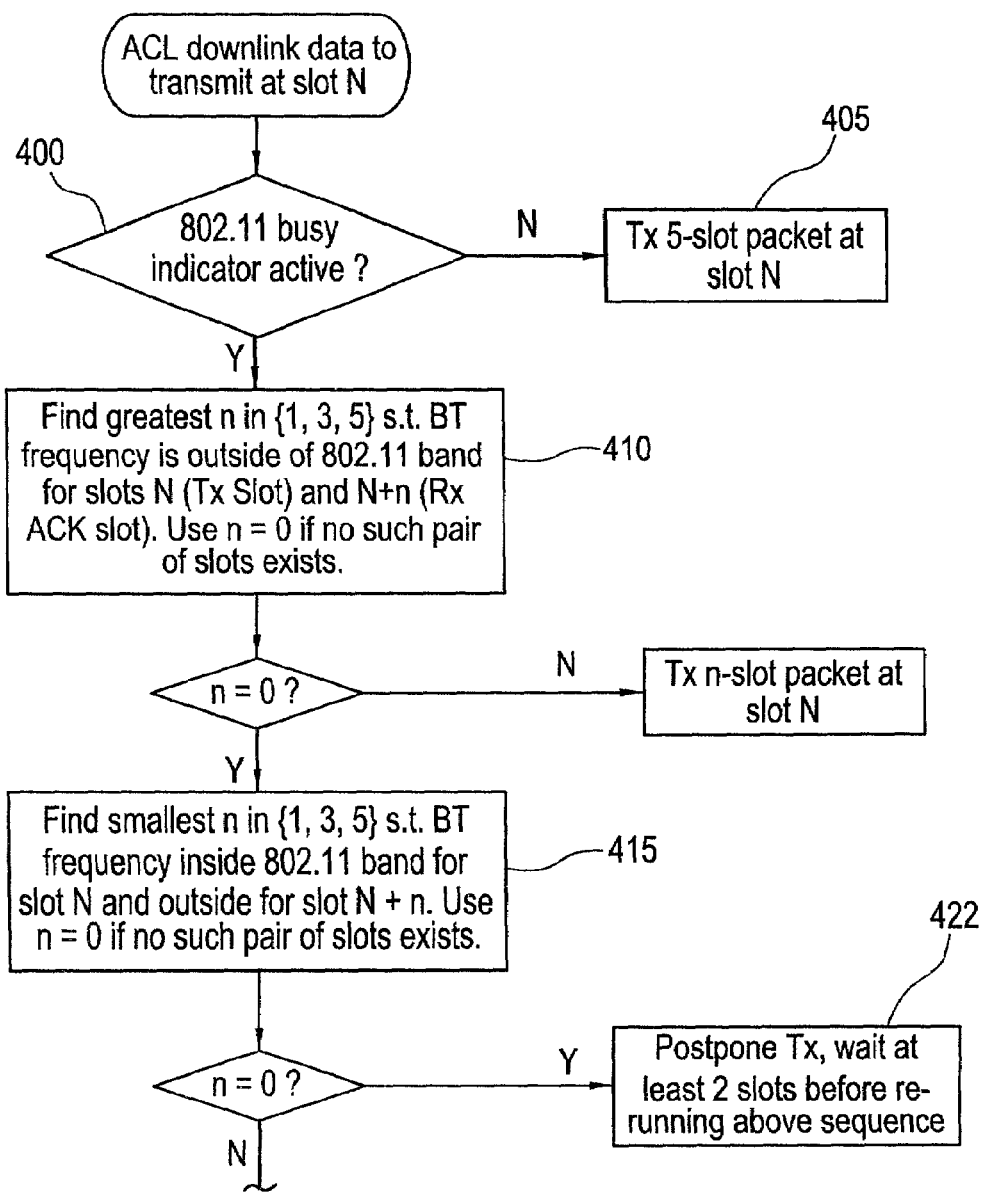
FIGS. 17A and 17B depict a flow diagram for a procedure for downlink communication of non-synchronous type data using a frequency hopping communication protocol in the same frequency band as a fixed frequency communication protocol.
Figure 17B:
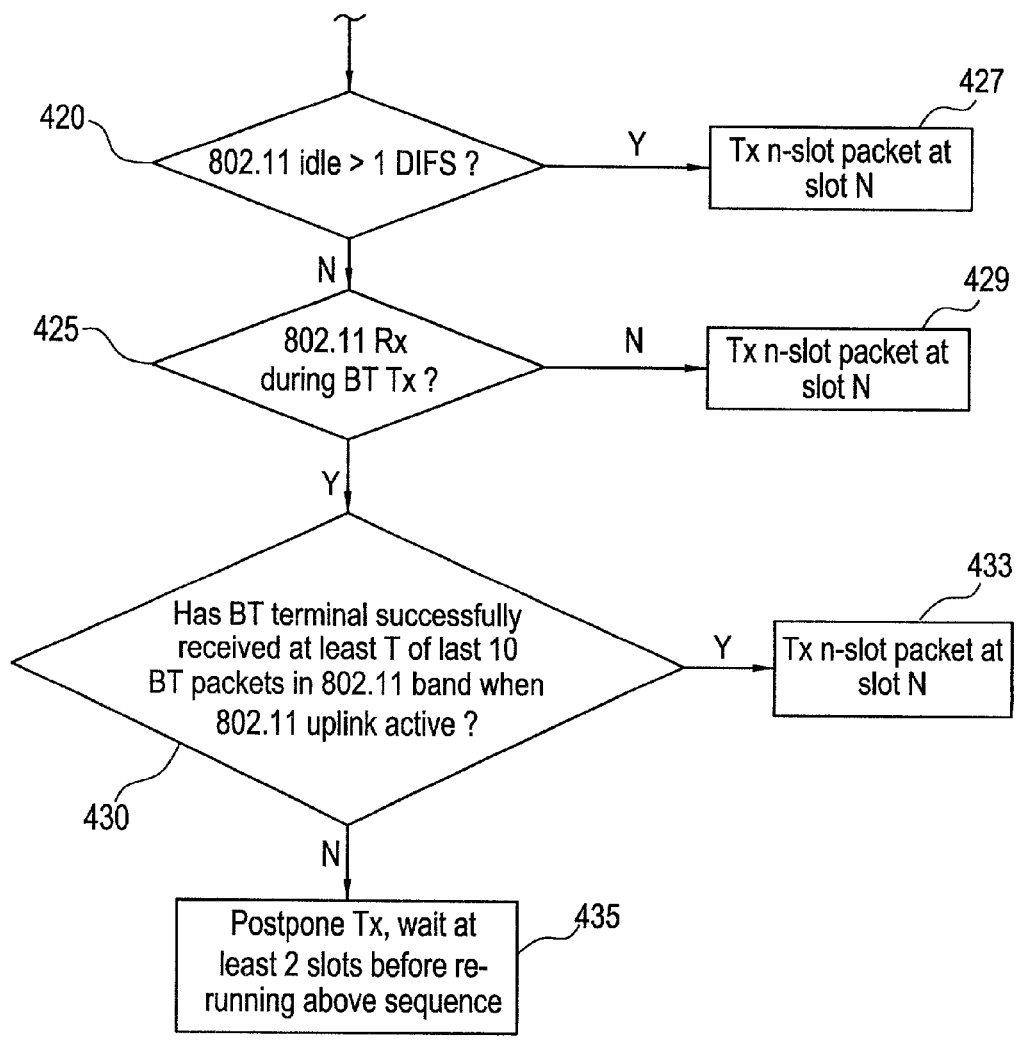

The procedure for transmitting data on the downlink ACL from the MPD is shown in FIGS. 17A and 17B. First, if in step 400 the 802.11 network is idle and the network load is determined to be sufficiently small, the MPD in step 405 transmits a 5-slot ACL packet immediately, without regard to whether the BT hop frequency falls inside the 802.11 band at any time during the data exchange (i.e., during either the data transmission or the ACK). If the measured 802.11 network load is not sufficiently small, the MPD then in step 410 monitors the state of the BT hop frequency generator over the next several slots to see if it can complete a multi-slot transmission in which both the transmit data and the corresponding ACK are outside the 802.11 band. The MPD attempts to identify the largest multi-slot packet (1,3 or 5 slots) that satisfies this condition. If such a packet can be found, the MPD transmits the packet.

If such a packet cannot be found, then either the transmit frequency is in band, the ACK frequencies for the 1, 3 and 5 slot packets are all in-band, or both. Therefore, steps 415 through 435 enumerated in FIGS. 17A and 17B perform the following logic. If the transmit frequency is in-band and at least one of the ACK frequencies is out-of-band, the MPD will transmit the shortest multi-slot packet that meets this condition if (1) the 802.11 network is idle for at least 1 DIFS, or (2) the MPD can guarantee that it will not receive 802.11 uplink data during the ACL packet's transmission, or (3) the MPD has been successful in transmitting T of the last ten ACL packets in the 802.11 band to the BT terminal during an active 802.11 uplink transmission, where T is an appropriate threshold. If none of conditions 1–3 can be satisfied, the MPD waits at least two slots before attempting to transmit again using the above procedure.

Figure 12A:
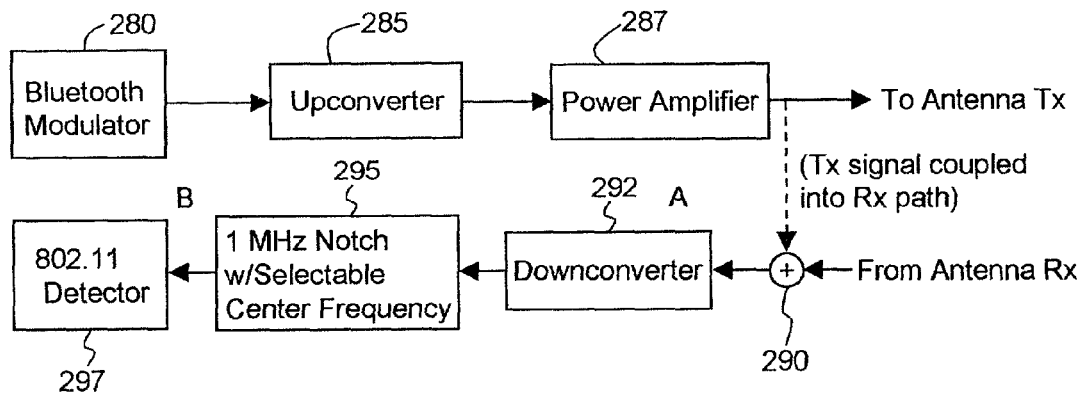
FIG. 12A is a block diagram showing a configuration in an MPD suitable for simultaneous downlink of information using a frequency hopping communication protocol and uplink of information using the fixed frequency communication protocol in the same frequency band.
Figure 12B:
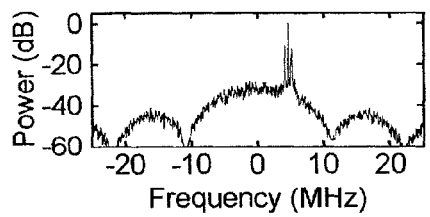
FIGS. 12B and 12C are spectrum diagrams of various signal points in the block diagram of FIG. 12A.
Figure 12C:
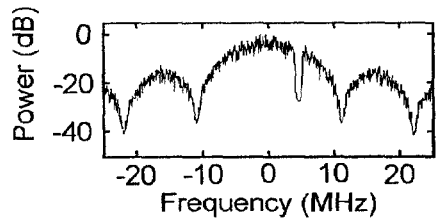

In case (3) above, the MPD prevents receive signal energy reflected from the transmitted BT signal from interfering with the 802.11 receiver by notching the BT signal from the receive signal path at the input to the 802.11 detector. The notch is replaced by an allpass filter having the same group delay as the notch as soon as the BT transmission terminates. This technique is illustrated in FIGS. 12A through 12C.

If at any time during the BT transmission the MPD also needs to transmit a 802.11 packet, it notches a 1 MHz segment out of the 802.11 signal spectrum to accommodate the BT signal, as described above in section 2.1.1.3. The MPD replaces the notch with an allpass filter having the same group delay as the notch when either the 802.11 or BT transmission terminates.

Figure 18:
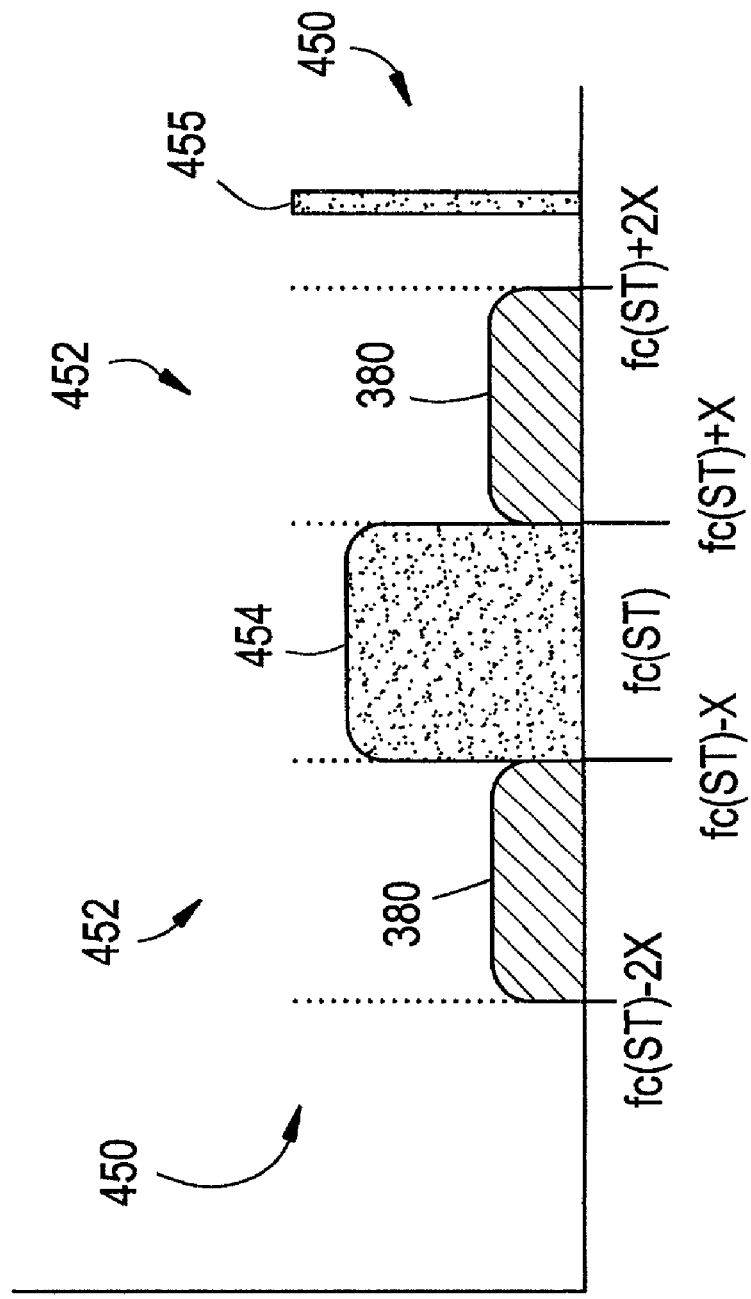
FIG. 18 is a spectrum diagram that shows an optional additional procedure for downlink communication of asynchronous type data using a frequency hopping communication protocol in the same frequency band as a fixed frequency communication protocol.

An optional and further refinement to the procedures of FIGS. 17A and 17B is shown in FIG. 18. The frequency band of the static protocol channel (e.g., an 802.11 channel) is shown at 454 and is centered at frequency fc(ST) Hz and extends between fc(ST)+X and fc(ST)−X. Due to transmitter and receiver third order non-linear distortion, significant energy appears in frequency bands adjacent to the frequency band of the static protocol channel. This is called the IM3 band and is shown in FIG. 18 at 380 to exist between fc(ST)−2X and fc(ST)−X, and between fc(ST)+X and fc(ST)+2X. It is desirable to inhibit transmission of frequency hopping protocol signal 455 if its transmit frequency or its ACK at least partially overlaps with the frequency band of the static protocol channel or with certain portions of the IM3 band caused by the non-linear distortion referred to above. The frequency of the forward/information packet using the frequency hopping protocol signal 455 is called f(TX) and the frequency of the ACK packet is f(RX).

The procedures of FIGS. 17A and 17B involve a determination whether f(TX) and f(RX) at least partially overlaps or falls within the static protocol channel between fc(ST)−X and fc(ST)+X. Assuming the frequency(ies) of the forward channel packet(s) and the ACK are both outside the static protocol channel, the forward channel packet(s) will be sent (regardless of whether it overlaps with the IM3 band) if the f(RX) is either outside the IM3 band completely or if it overlaps with the IM3 band, but the expected power of the ACK signal (determined from reception of prior ACK signals from that device) is greater than the level of the power in the IM3 band (at that frequency) by a required signal-to-noise ratio. If it is, then the forward channel packet(s) is transmitted using the frequency hopping protocol because it is known that the power of the ACK will be sufficient to be discriminated even in the presence of the IM3 energy. Otherwise, the packet is not transmitted, and transmission is deferred for two slots. That f(TX) may fall within the IM3 band is not a concern because it is a signal that will be transmitted from the MPD at a sufficient power to be received by another device. In FIG. 18, frequency band 450 corresponds to the band where the frequency hopping protocol signal would be permitted to hop without using the optional procedures described herein. Reference numeral 452 identifies the expanded frequency band where the frequency hopping protocol signal is permitted to hop if the signal level of the ACK of the frequency hopping protocol signal is greater than the energy level of the IM3 band (by a predetermined amount) at that frequency (at the receiver). The wireless device performing this algorithm will have the capability of measuring the energy level of the IM3 band.

The use of the optional procedures of FIG. 18 together with the procedures of FIGS. 17A and 17B, achieves an overall logic flow that is summarized as follows.

Find largest n in {1,3,5} such that:
1. The frequency of the forward channel packet(s), f(TX), are outside of static protocol channel, and either
2(a) The frequency of the ACK signal, f(RX) is outside of both the static protocol channel and the IM3 band, or
2(b) The frequency of the ACK signal, f(RX) is inside the IM3 band and the expected power of the ACK signal exceeds the IM3 power (in the BT channel bandwidth) by an appropriate SNR threshold.

If such an n exists, then transmit; otherwise, wait two slots and then try again.

2.1.2.2.2 Bluetooth SCO Operation-Uplink

Figure 19A:
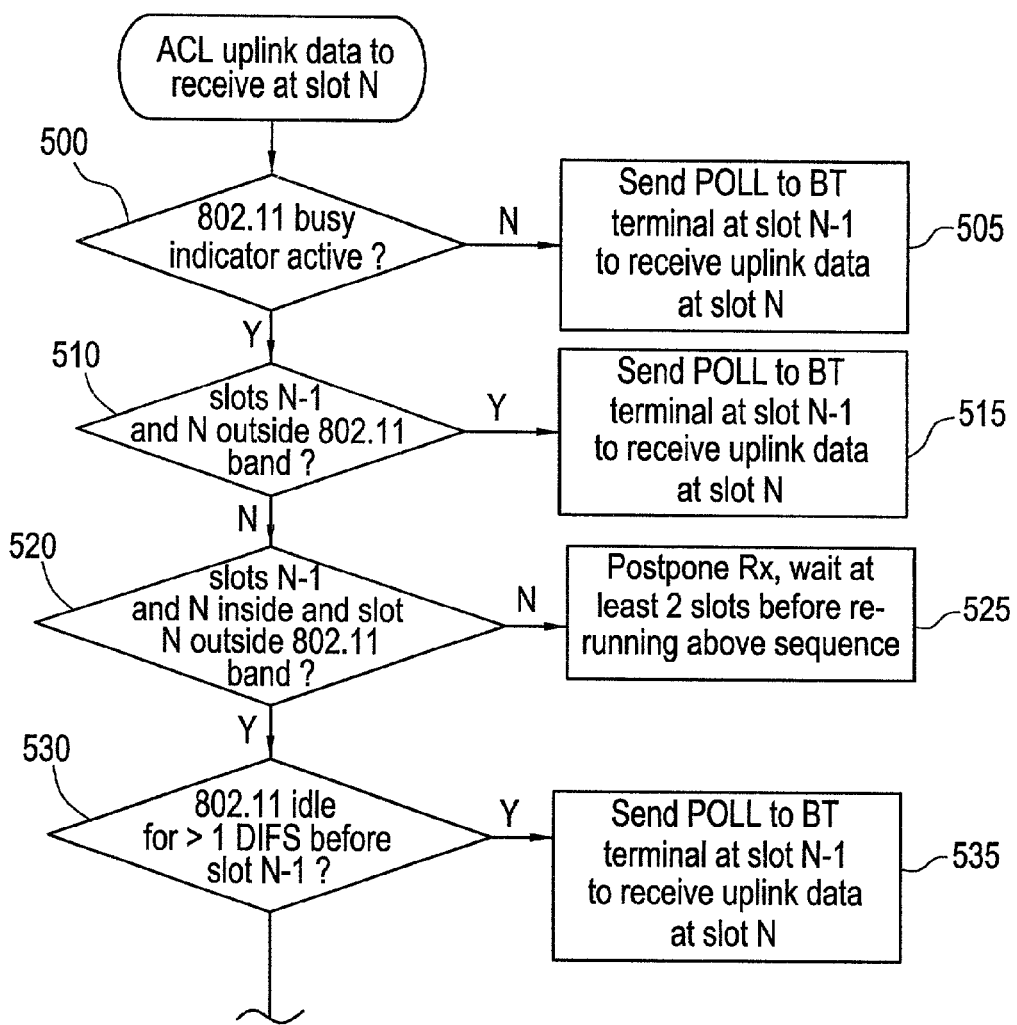
FIGS. 19A and 19B depict a flow diagram for a procedure for uplink communication of asynchronous type data using a frequency hopping communication protocol in the same frequency band as a fixed frequency communication protocol.
Figure 19B:
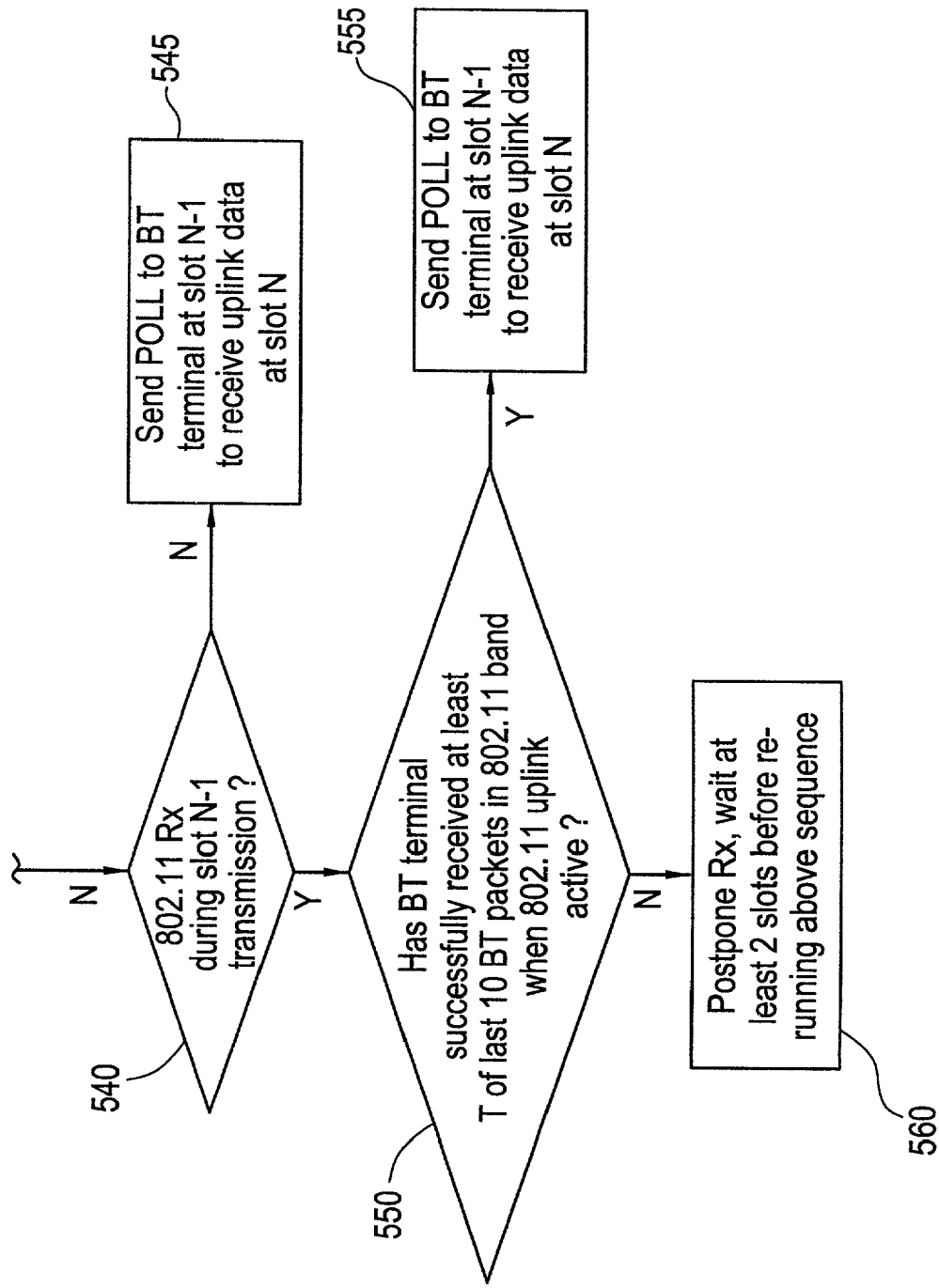

The procedure for receiving data on the uplink ACL at the MPD is shown in FIGS. 19A and 19B. First, in step 500, if the 802.11 network is idle and the network load is determined to be sufficiently small, in step 505 the MPD polls the BT slave without regard to whether the BT hop frequency falls inside the 802.11 band during either the POLL or uplink data packets. If the 802.11 network load is not sufficiently small, in steps 510 through 560 enumerated in FIGS. 19A and 19B, the logic performed is as follows. The MPD polls the slave only if (1) the hop frequency for the POLL packet and the uplink ACL packet are both outside the 802.11 band, or (2) the hop frequency for the POLL packet is inside the 802.11 band, the hop frequency for the uplink ACL packet is outside the 802.11 band, and either (a) the 802.11 network is idle for at least one DIFS interval at the beginning of the POLL packet's transmission, or (b) there is no 802.11 uplink data to receive at the MPD during the POLL packet's transmission, or (c) the MPD has been successful in transmitting T of the last ten POLL packets in the 802.11 band to the BT terminal during an active 802.11 uplink transmission, where T is an appropriate threshold. If conditions (1) and (2) are not met, the MPD waits at least 2 slots before attempting to use the above procedure again to receive uplink data.

2.2 Operation For MPDs Supporting Bluetooth, 802.11b DS and HomeRF

This section describes how the interference mitigation algorithm operates in networks supporting Bluetooth, 802.11b DS and HomeRF (up to 10 Mbps) protocols in the 2.4 GHz ISM band. The approach is similar but slightly more complicated than the approach used to support only Bluetooth and 802.11 described above.

The algorithm described in this section assumes that at most one BT piconet (a TDMA connection between a master and up to 8 slaves), at most one channel of 802.11b DS, and one HomeRF network are managed simultaneously from the MPD. Again, the techniques described herein can be used to support multiple WLANs of the same type, e.g., two more Bluetooth networks, two or more 802.11 networks and two or more HomeRF networks.

2.2.1 HomeRF Operation

Figure 20:
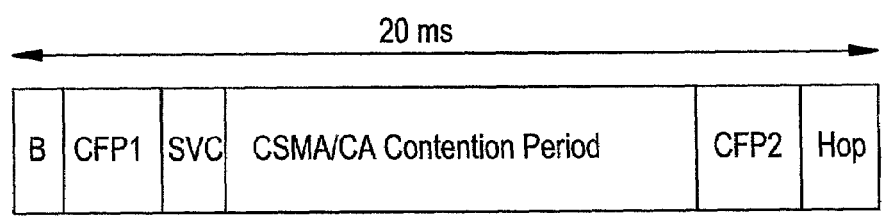
FIG. 20 is a timing diagram for a time frame of information transmitted in accordance with still another type of frequency hopping wireless communication protocol, such as HomeRF™.

The HomeRF transmission protocol uses frequency-hopped FSK modulation (2 or 4 level FSK, up to 10 Mbps). The hop rate is 50 Hz. During each 20 ms dwell, the master (in this case, the MPD) and slaves exchange data in a superframe consisting of the following fields as shown in FIG. 20:

Beacon Interval—Period during which the master broadcasts superframe configuration data to the slaves (e.g., number and duration of each field, number of slots in each field, etc.)

CFP1—Contention-free period used to retransmit lost voice packets from the CFP2 period of the previous dwell Service Slot—Slot during which slaves are free to page the master to gain access to the network Contention Period—Period during which the master and slaves exchange asynchronous data using CSMA/CA.

CFP2—Contention-free period during which the master and slaves exchange isochronous voice information using TDMA.

Further details on the HomeRF communication protocol are found in the document published by the HomeRF Working Group, entitled "HomeRF 2.0 Protocol Specification," 2000.

2.2.1.1 Timing

Figure 21A:
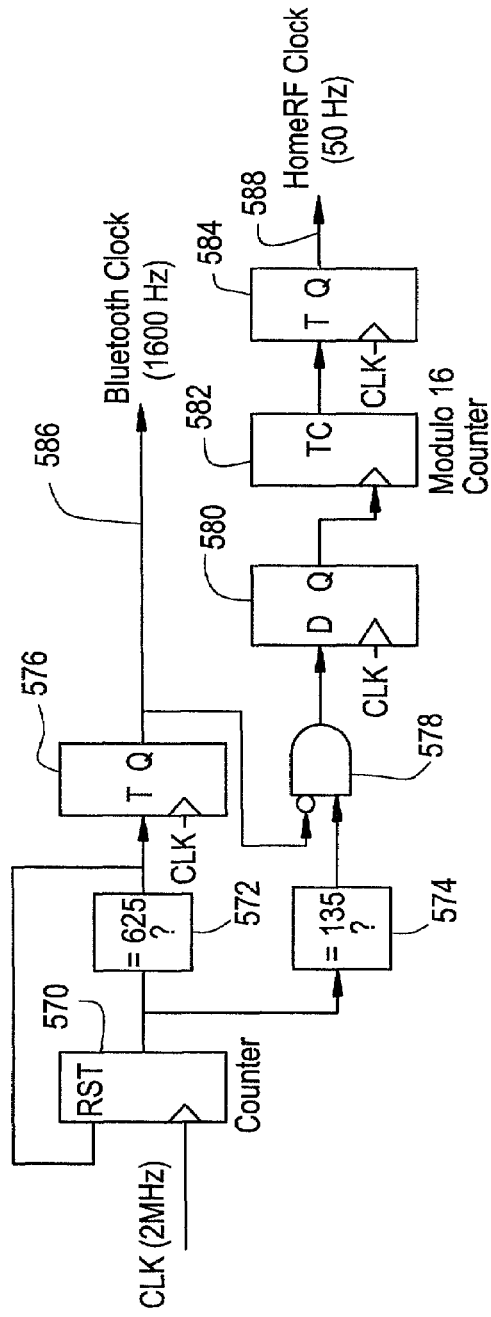
FIG. 21A is a block diagram of a clock circuit arrangement designed to frequency lock and phase align the clock signals of two frequency hopping communication protocols.
Figure 21B:
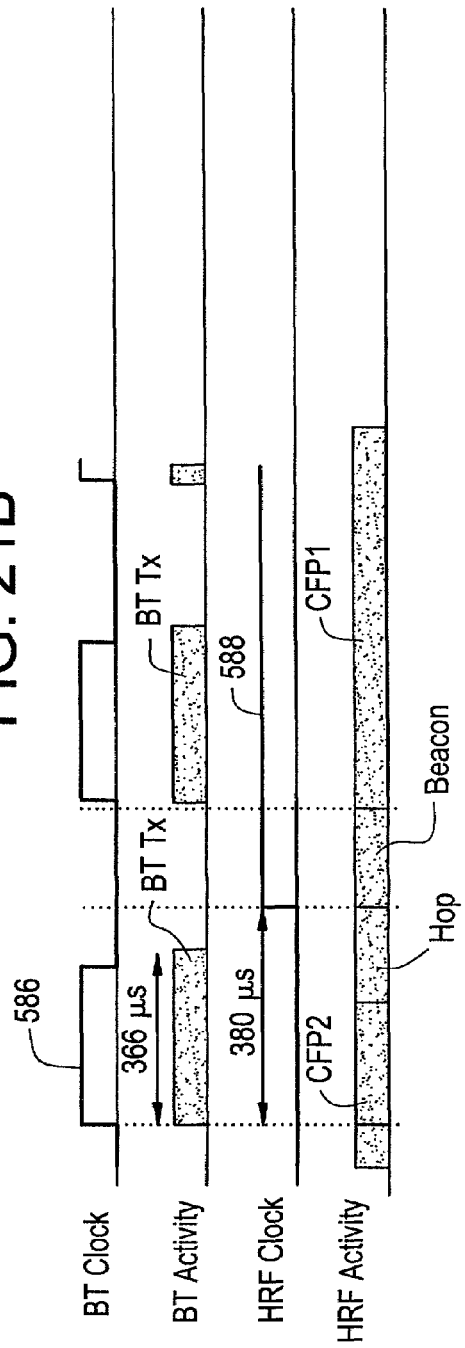
FIG. 21B is a timing diagram showing a desired phase alignment between the clock signals of two frequency hopping protocols.

To prevent BT data transmissions from interfering with the HomeRF Beacon signal, the BT and HomeRF hop clocks are frequency-locked and phase-aligned in the MPD so that the Beacon Interval occurs during the "dead time" of the BT slot in which there is no transmission, as shown in FIGS. 21A and 21B. Also (not shown in FIGS. 21A and 21B), the MPD generally attempts to phase align BT SCO transmissions with respect to the HomeRF superframe so that they do not overlap in time with HomeRF CFP1 voice slots (although this may not always be possible for various reasons). This minimizes the possibility of interruptions in synchronous data transmission, such as a voice or video, using both HomeRF and Bluetooth.

FIG. 21A shows a clock arrangement wherein a clock signal (CLK) from a common clock signal source is coupled to a counter 570. The counter 570 is in turn coupled to a comparator 572 and a comparator 574. The CLK signal is also coupled to a flip-flop 576. The output of the comparator 572 is coupled to the T input of the flip-flop 576 and to the reset input of the counter 570. The output of the comparator 574 is coupled to one input of an AND gate 578. The output of the flip-flop 576 is coupled to the other (inverted) input of the AND gate 578. The Q output of the flip-flop 576 is the Bluetooth clock signal (1600 Hz). The output of the AND gate 578 is coupled to the D input of a flip-flop 580. The Q output of the flip-flop 582 is coupled to the clock input of a modulo 16 counter 582. The TC output of the modulo 16 counter 582 is coupled to the T-input of flip-flop 584. The common CLK signal is coupled to the clock input of the flip-flop 584. The Q output of the flip-flop 588 corresponds to the HomeRF clock signal (50 Hz).

With reference to FIG. 21A together with FIG. 21B, the operation of the clock arrangement is as follows. The CLK signal, which in the example, is a 2 MHz clock signal drives the counter 570 to count. The comparator 572 determines when the count value reaches 625, and when it does, it resets the counter 570, and drives the T input of the flip-flop 576. Thus, the output of the flip-flop 576 is 2 MHz divided by 625, a 1600 Hz clock signal useful for Bluetooth control. The comparator 574 determines when the count value of the counter 570 reaches 135 to drive one input of the AND gate 578. The output of the AND gate 578 will go high when the output of the flip-flop 576 is low concurrent with the output of the comparator 574 being high. This ensures that the AND gate 578 will go high only when Bluetooth clock signal is low. When the AND gate 578 goes high, the D input of the flip-flop 580 goes high, which in turn drives the count value of the modulo 16 counter 582 up one count, synchronized to the CLK signal. When the modulo 16 counter 582 reaches 15, it drives the T input of the flip-flop 584, which, synchronized to the CLK signal, outputs a clock signal useful for HomeRF control.

The result of the configuration shown in FIG. 21A is that the rising edge of the HomeRF clock is guaranteed to be 380 μs (at least 366 μs corresponding to the duration of a data or non-silent period of a Bluetooth time slot but not more than the period of the Bluetooth clock signal minus the duration of the Beacon interval) after the rising edge of the Bluetooth clock. Essentially, the logic generates the first and second clock signals by separately frequency dividing the common clock signal to generate first and second divided signals, and phase aligning rising edges of the first and second divided signals such that the rising edge of the first clock signal occurs a predetermined period of after the rising edge of the second clock signal. In this example, a convention is adopted in which the BT master schedules transmission of a time slot immediately following the rising edge of the Bluetooth clock and the HomeRF master schedules transmission of the Beacon interval immediately following the rising edge of the HomeRF clock. By ensuring that the rising edge of the HomeRF clock begins a time period equal to or greater than the duration of a Bluetooth slot, the Beacon interval, which starts a HomeRF superframe, will occur during a time period in which the Bluetooth network is quiet.

2.2.1.2 HomeRF Operation

Figure 23:
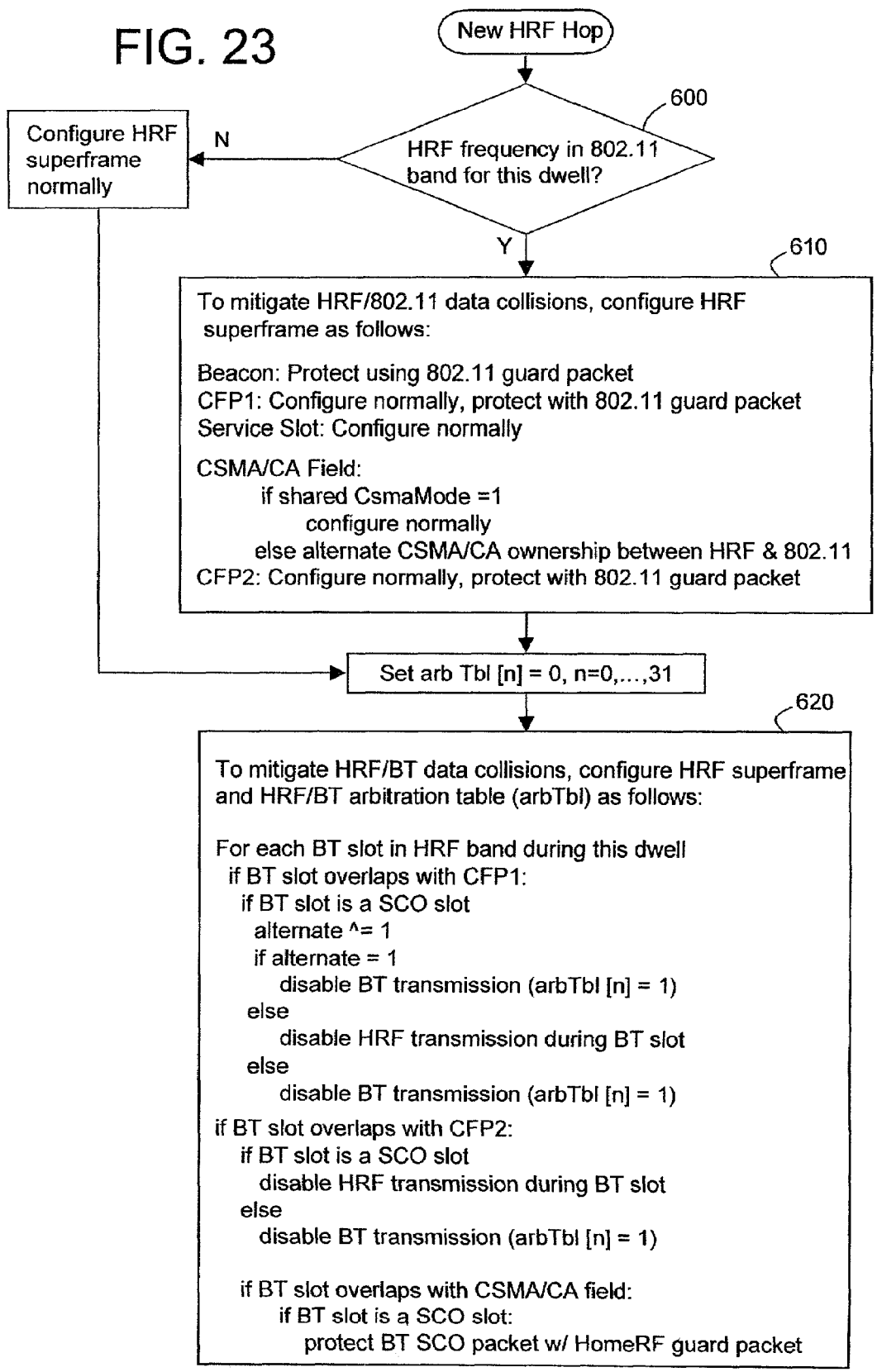
FIG. 23 is a flow diagram for a procedure to manage communication in the same frequency band where two frequency hopping communication protocols and one fixed frequency communication protocol are active and synchronous type data is communicated using the two frequency hopping communication protocols.

The MPD adjusts its operating parameters before each 20 ms HomeRF dwell in order to minimize cross-network interference. A flowchart describing the MPD processing before each 20 ms HomeRF superframe is shown in FIG. 23.

If in step 600 the hop frequency for a particular HomeRF superframe falls outside the 802.11 band, the MPD configures the superframe normally (i.e., as it would in a HomeRF-only environment). For superframes in which the hop frequency falls inside the 802.11 band, the following steps are taken within block 610:

CFP1 and CFP2 are configured normally, except the voice slots are protected using an 802.11 guard packet (described above) to guarantee reliable voice data delivery.

Service slot configured normally.

Beacon signal configured normally.

Contention Period configured in one of two ways:

In one mode of operation-the so-called "shared CSMA mode", the 802.11 and HomeRF nodes are allowed to compete for access to the spectrum using CSMA/CA. In this case, the MPD must use similar network timing parameters for both networks (e.g., slot time, backoff interval, SIFS, DIFS, etc.) in order to ensure that both networks are given an equal opportunity to compete for access to the spectrum.

If Shared CSMA Mode is not enabled, the MPD alternates access ownership between 802.11 and HomeRF during the contention period based on their relative network load. For example, if the 802.11 network load is 10% and the HomeRF CSMA network load is 30%, the MPD allows the HomeRF to use the contention period 3 out of every 4 times both networks share the same frequency, and allows the 802.11 network to use the contention period 1 out of every 4 times. For superframes in which the MPD assigns ownership priority to HomeRF, the MPD transmits an 802.11 guard packet immediately before the contention period to prevent unwanted 802.11 network accesses. For superframes in which 802.11 is given ownership priority, the MPD removes the contention period from the superframe configuration data (in the beacon) to prevent HomeRF CSMA accesses.

Figure 22:
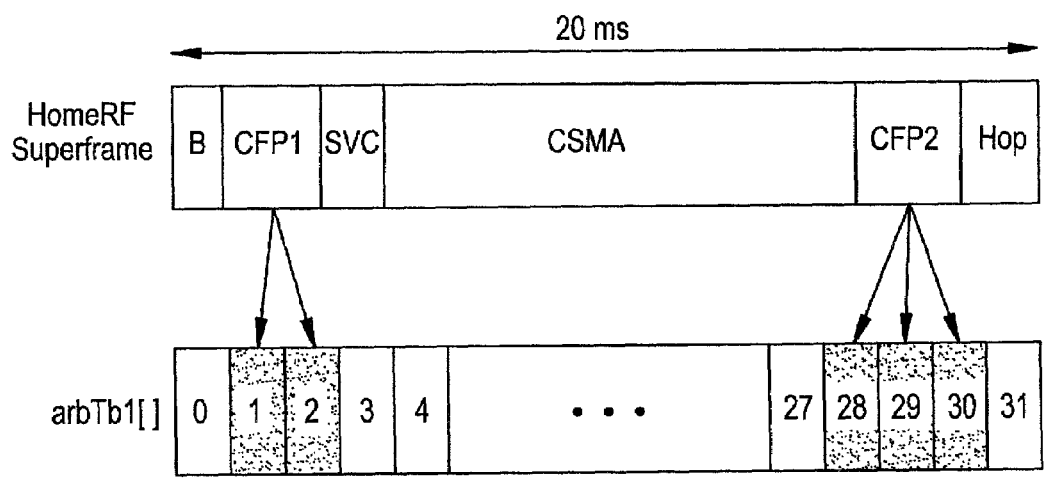
FIG. 22 is a diagram showing how an arbitration table is built to manage communication in the same frequency band where two frequency hopping communication protocols are active according to the present invention.

To protect HomeRF voice slots from BT data collisions (in addition to using the phase alignment approach described above), the MPD uses a HomeRF/Bluetooth network arbitration table (arbTbl) to inhibit BT data transmissions that would otherwise interfere with the HomeRF voice slots. In general, the concepts of the arbTbl can be used to arbitrate the transmission of information of different data types (synchronous and asynchronous) and/or subtypes (voice, video, computer data) on two or more networks that may collide in frequency and time, where a priority is given to a certain data type on one network over the same or other data types on the other network. The arbTbl is shown in FIG. 22.

There are 32 elements in the arbTbl. Each element corresponds to one of the 32 BT slots that comprise a 20 ms HomeRF superframe. If the MPD determines that a BT timeslot could collide with a HomeRF voice data field, it sets the appropriate arbTbl element to one to inhibit transmission during that BT timeslot.

Before each new HomeRF hop to a new frequency, the MPD monitors the state of the BT hop frequency generator to determine the 32 BT hop frequencies for the next 20 ms HomeRF superframe. In block 620, for each BT hop frequency that interferes with the HomeRF band, the following action is taken:

- If the BT slot overlaps with the CFP2 field: If the BT slot is a SCO slot, the MPD inhibits HomeRF transmission during the BT SCO slot by setting values in the Beacon interval to decommission (or eliminate) the appropriate CFP2 slot or slots for that superframe in the Beacon field. If the BT slot is not a SCO slot, the MPD inhibits the BT slot's transmission by setting the arbTbl element for that BT slot to one.
- If the BT slot overlaps with the CFP1 field: If the BT slot is not a SCO slot, the MPD sets the appropriate arbTbl element to one in order to inhibit the BT slot's transmission. If the BT slot is a SCO slot, there are two procedures that are possible. One procedure, shown block 620 of FIG. 23, is to alternate priority between the BT SCO slot and the HomeRF CFP1 field. This is done by setting a variable, such as the one called "alternate" in the flow chart, to an initial value, for example, 1. Each time the logic proceeds through this process, the value of the alternate variable is toggled from 1 to 0, or 0 to 1. When the value of alternate is 1, the BT SCO transmission is disabled by writing a 1 to the arbTbl entry for that BT slot. When the value of alternate is 0, the values of the Beacon interval for the HomeRF superframe are set to decommission or eliminate the CFP1 field. This process of alternating priority between the HomeRF CFP1 and the BT SCO slot that collides with it, occurs with respect to similar collisions that occurred in prior superframes and similar collisions that may occur in future superframes. That is, if a similar collision was determined in a prior superframe and the BT SCO slot was given priority, then in the same type of collision in a current superframe would result in the HomeRF CFP1 having priority.

The second way of handling the situation when the BT slot is a SCO slot and overlaps with the CFP1 field (not specifically shown in FIG. 23) is to attempt to place a non-information bearing "dummy segment" or segments at an appropriate location(s) in the superframe by manipulating the information in the Beacon interval for that the superframe in order to move the CFP1 field(s) away from the SCO slot. Alternatively, the values for the information in the Beacon interval can be set to ensure that the CFP1 field(s) do not coincide with the one or more BT time slots that are scheduled to transmit synchronous data. If for any reason it is not possible to move the CFP1 field away from those time slots, the MPD assigns alternating priority to the BT slot and the CFP1 field(s) in the manner described above using the alternate variable.
- If the BT slot overlaps with the Contention Period: If the BT slot is a SCO slot, the MPD transmits a HomeRF guard packet (similar to the 802.11 guard packet described above) immediately before the SCO slot in order to block HomeRF CSMA transmissions during that slot.

The arbTbl is built in advance for next 32 BT slots that coincide with the next HomeRF superframe. That is, prior to the transmission of the HomeRF superframe, an arbTbl is built for the corresponding 32 BT slots. The value of the arbTbl is read and examined prior to transmission of each BT slot. In addition, the parameters for a Beacon interval of a HomeRF superframe are determined prior to transmission of that superframe, so as to manipulate the position or existence of the CFP1 or CFP2 fields according to the logic of FIG. 23 and the foregoing description.

2.2.2 802.11 Operation

The approach used to manage 802.11 network activity from the MPD for networks supporting 802.11, HomeRF, and Bluetooth is identical to that used to support 802.11 and Bluetooth described above.

2.2.3 Bluetooth Operation

Bluetooth operation is similar, but slightly more complicated in multi-mode systems using 802.11, BT and HomeRF than in systems using 802.11 and Bluetooth only. These differences are discussed below.

2.2.3.1 SCO Operation

SCO operation is nearly identical to the 802.11/BT approach, except when HomeRF is involved, there is a chance that a SCO transmission could be disabled to prevent a collision with a HomeRF voice slot. If the arbTbl entry for a downlink SCO slot is nonzero, the MPD does not transmit that slot. If the arbTbl entry for an uplink SCO slot is nonzero, the MPD directs the BT slave not to transmit the uplink SCO slot in the BT slot immediately preceding the SCO slot.

2.2.3.2 ACL Operation-Downlink

Figure 24A:
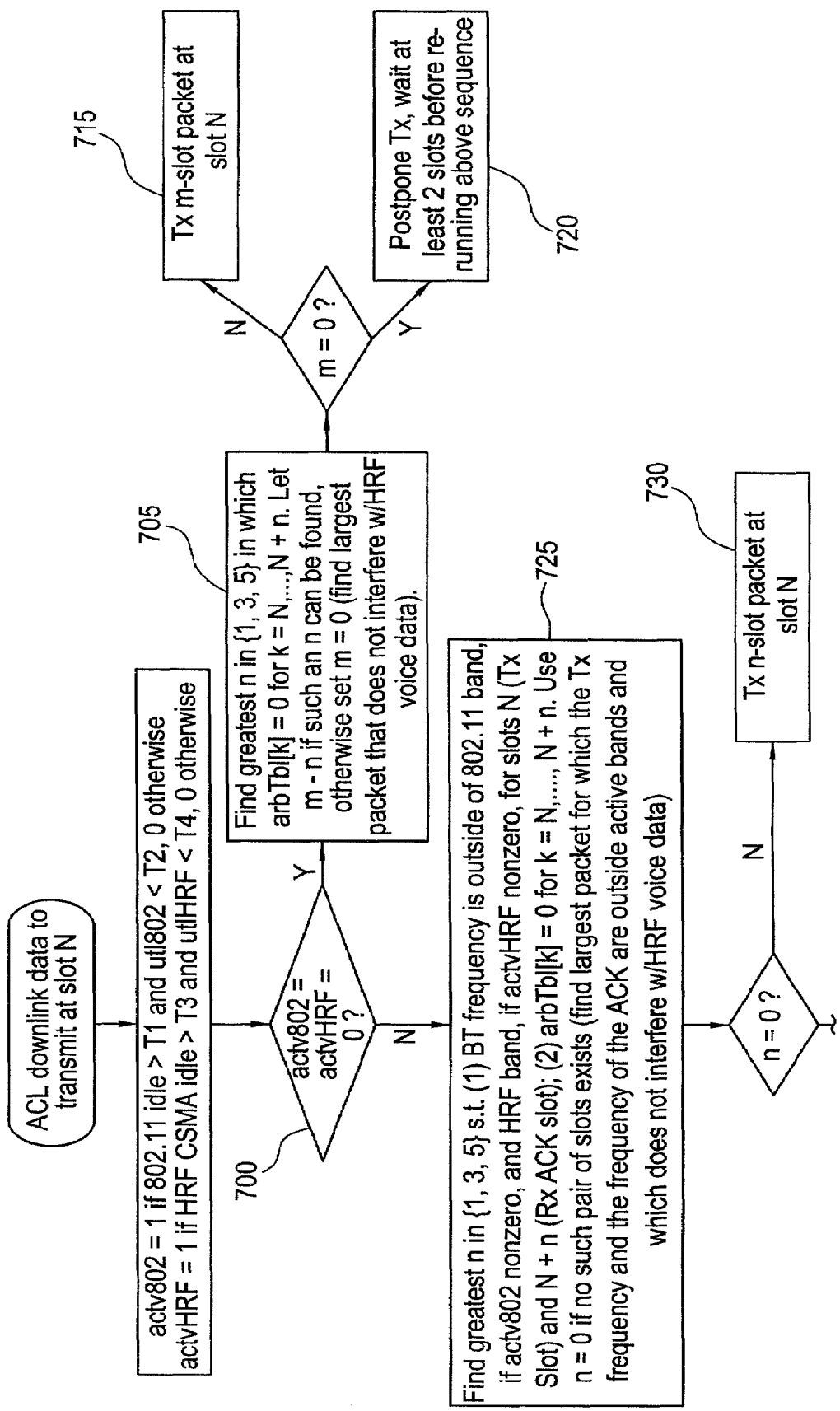
FIGS. 24A, 24B and 24C depict a flow diagram for a procedure to manage communication in the same frequency band where two frequency hopping communication protocols and one fixed frequency communication protocol are active and asynchronous type data is downlink communicated.
Figure 24B:
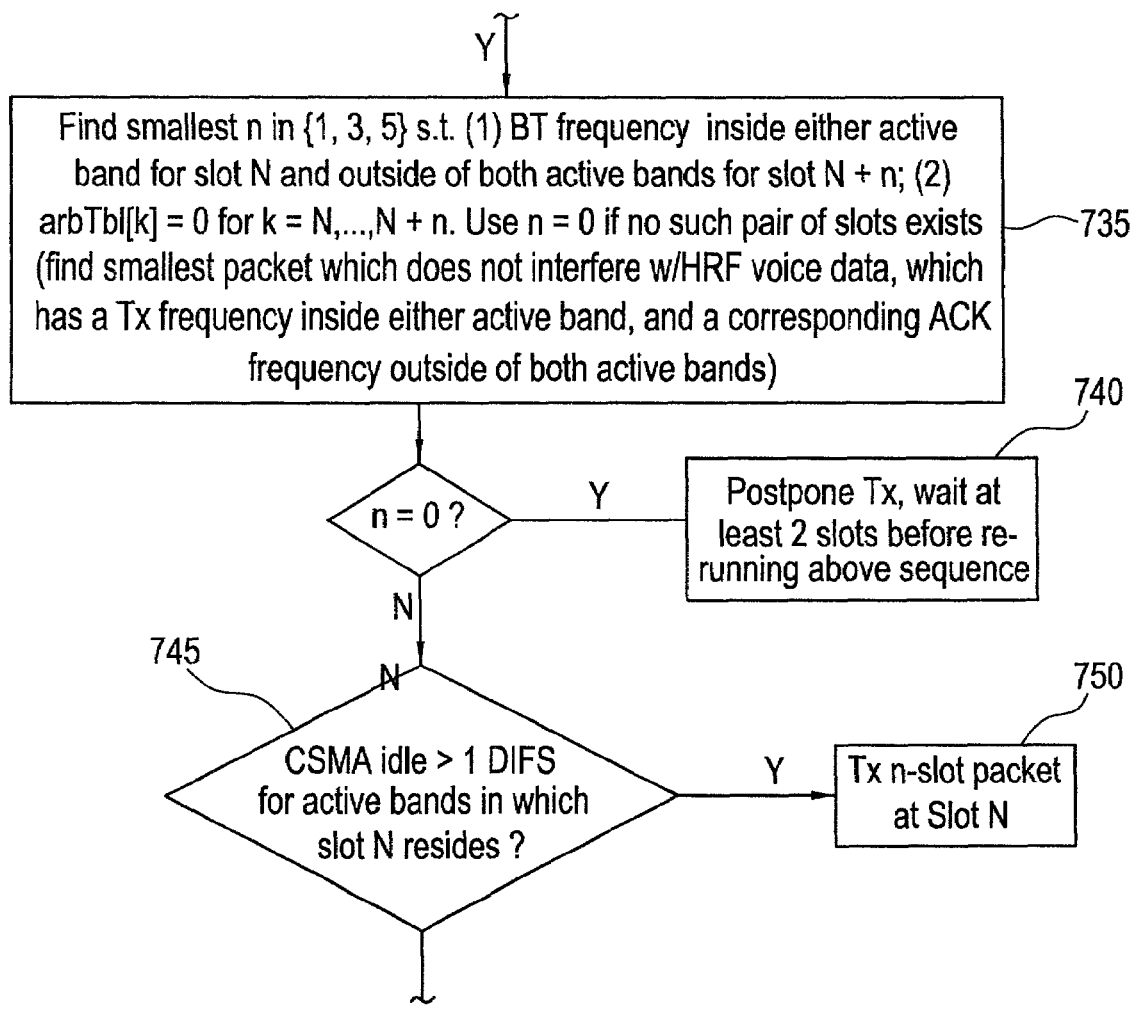
Figure 24C:
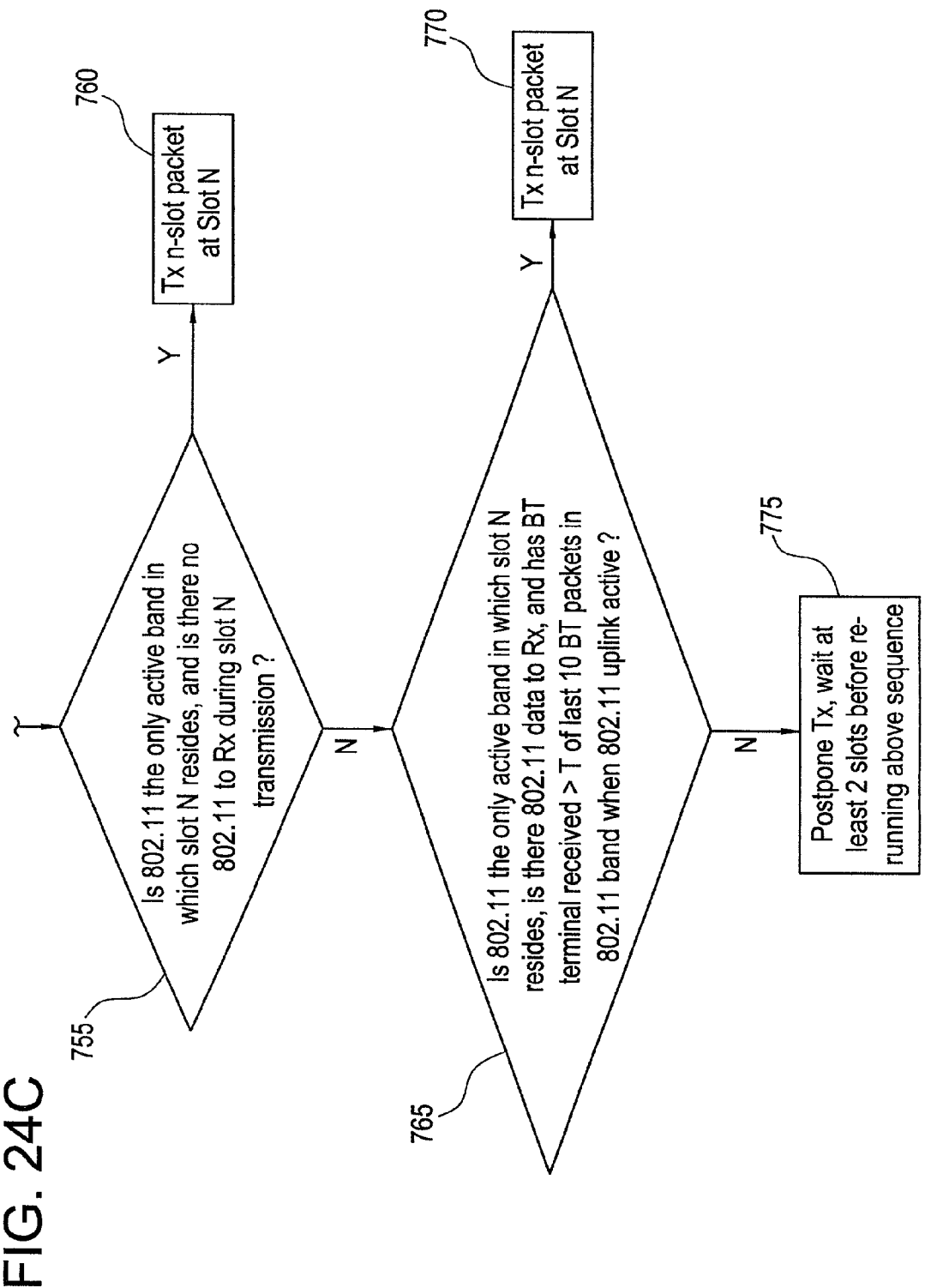

The procedure for transmitting data on the downlink ACL from the MPD is shown in FIGS. 24A, 24B and 24C. The approach is conceptually similar to the BT/802.11 approach; the only changes are the inclusion of (1) the arbTbl to inhibit ACL transmissions that would otherwise interfere with HomeRF voice slots, and (2) the HomeRF contention period in the CSMA processing.

First, in step 700, if the network loading of the 802.11 and HomeRF CSMA networks is determined to be sufficiently small, in step 705 the MPD identifies the largest multi-slot packet (1,3, or 5 slots) having non-zero arbTbl values during both the transmit portion and the ACK. If such a packet can be found, the MPD transmits the packet immediately in step 715, without regard to whether the BT hop frequency falls inside the 802.11 or HomeRF band during either the data transmission or the ACK. If such a packet cannot be found, in step 720 the MPD waits at least 2 slots before attempting to transmit ACL data again.

If the measured network load is not sufficiently small, in step 725 the MPD then monitors the state of the BT hop frequency generator over the next several slots to see if it can complete a multi-slot transmission in which (1) both the transmit data and the corresponding ACK are outside both active bands, and (2) none of the slots involved in the transmission (during either the transmit data or the ACK) have a non-zero arbTbl value. The MPD attempts to identify the largest multi-slot packet (1,3 or 5 slots) that satisfies this condition. If such a packet can be found, the MPD transmits the packet in step 730.

If such a packet cannot be found, then the last resort is to see if a packet duration can be found for which there are no nonzero arbTbl values during the transmit data or the ACK, the transmit frequency is inside either active band, and the ACK frequency is outside all active bands. The logic of steps 735 through 775 enumerated in FIGS. 24B and 24C is as follows. The MPD will transmit the shortest packet that meets these criteria if (1) the CSMA networks for each active band in which the ACL slot resides are idle for at least one DIFS interval, or (2) 802.11 is the only active band in which the transmit slot resides and there is no 802.11 data to receive during the BT transmission, or (3) 802.11 is the only active band in which the transmit slot resides, there is 802.11 data to receive during the BT transmission, and the MPD has been successful in transmitting at least T of the last ten ACL packets in the 802.11 band to the BT terminal during an active 802.11 uplink transmission, where T is an appropriate threshold. If none of conditions 1–3 can be satisfied, the MPD waits at least 2 slots before attempting to transmit again using the above procedure.

In case (3) above, the MPD prevents receive signal energy reflected from the transmitted BT signal from interfering with the 802.11 receiver by notching the BT signal from the receive signal path at the input to the 802.11 detector. The notch is replaced by an allpass filter having the same group delay as the notch as soon as the BT transmission terminates. This technique is illustrated in FIGS. 12A through 12C.

If at any time during the BT transmission the MPD also needs to transmit a 802.11 packet, it notches a 1 MHz segment out of the 802.11 signal spectrum to accommodate the BT signal. The MPD replaces the notch with an allpass filter having the same group delay as the notch when either the 802.11 or BT transmission terminates.

2.2.3.3 ACL Operation-Uplink

Figure 25A:
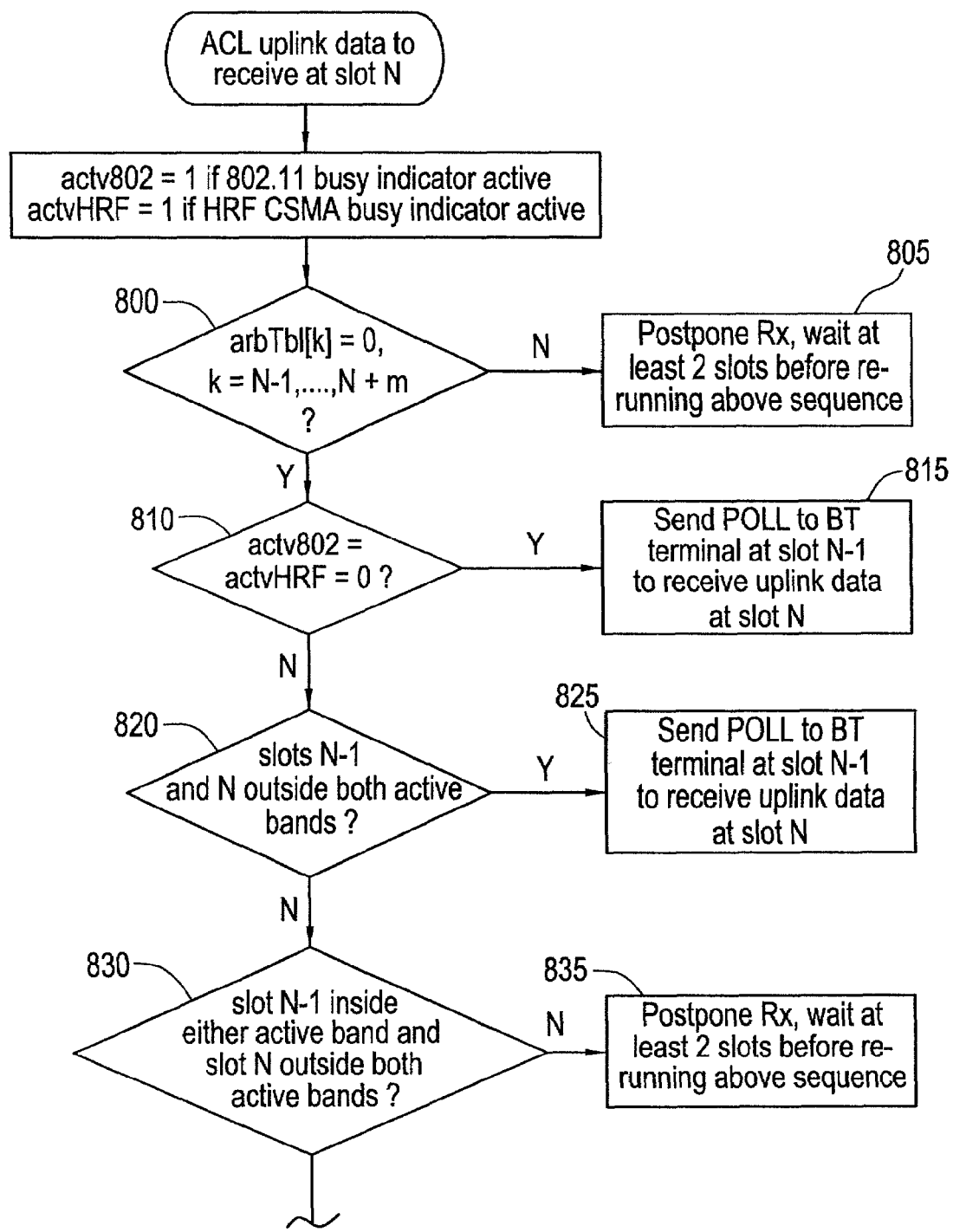
FIGS. 25A and 25B depict a flow diagram for a procedure to manage communication in the same frequency band where two frequency hopping communication protocols and one fixed frequency communication protocol are active and asynchronous type data is uplink communicated.
Figure 25B:
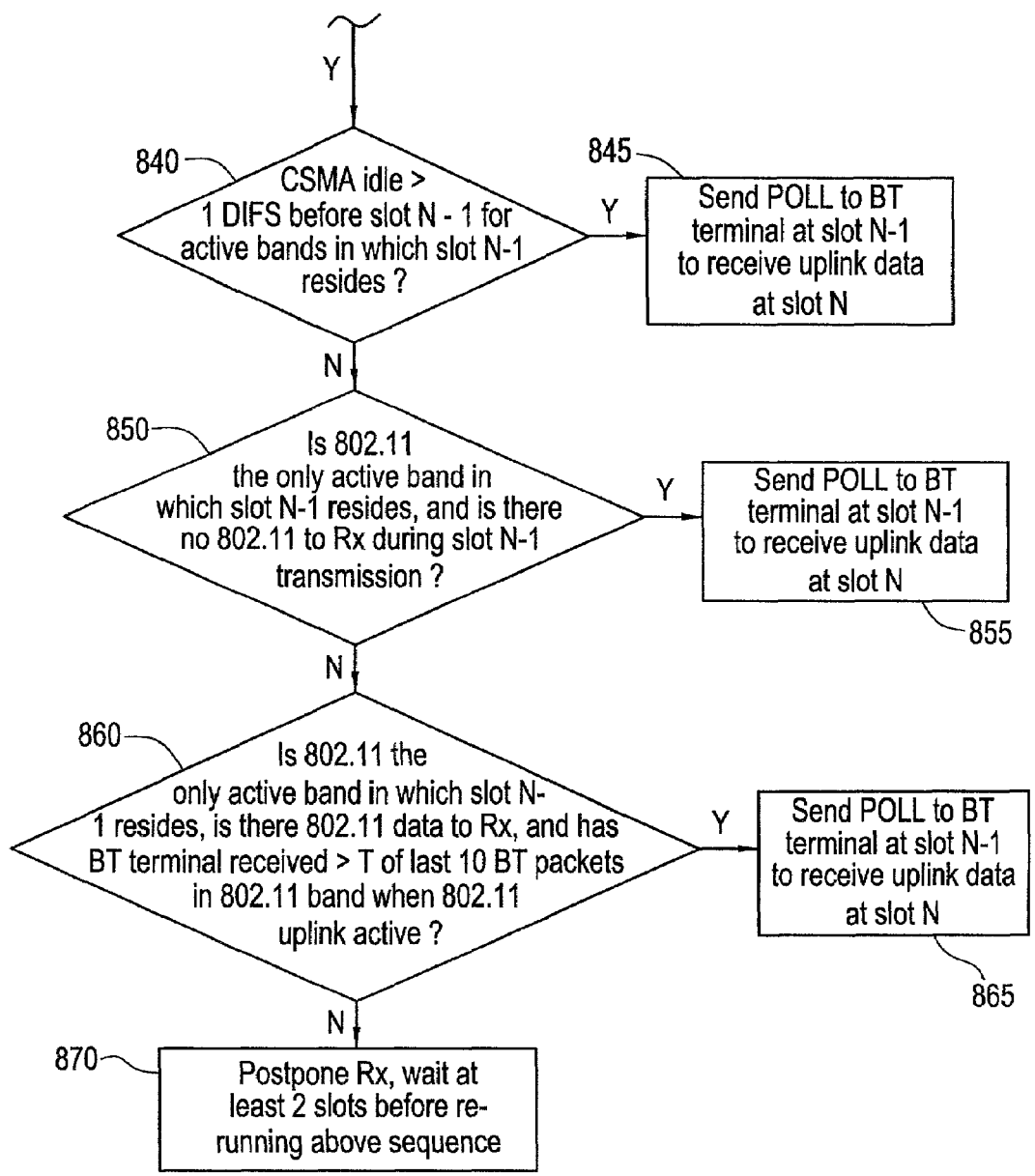

The procedure for receiving data on the uplink ACL at the MPD is shown in FIGS. 25A and 25B. First, in step 800, if the arbTbl values for the downlink POLL packet slot and the uplink ACL slot(s) are nonzero, the MPD does not send a POLL packet and waits at least 2 slots before attempting to receive uplink data in step 805.

Otherwise, if the network loading of the 802.11 and HomeRF CSMA networks is determined to be sufficiently small in step 810, in step 815 the MPD polls the BT slave without regard to whether the BT hop frequency falls inside the 802.11 or HomeRF band during either the POLL packet or the uplink ACL slot. If the network load is not sufficiently small, the logic of steps 820 through 870 enumerated in FIGS. 25A and 25B is performed as follows. The MPD polls the slave only if (1) the hop frequency for the POLL packet and the uplink ACL packet are both outside both active bands, or (2) the hop frequency for the POLL packet is inside either active band, the hop frequency for the uplink ACL packet is outside both active bands, and either (a) the active CSMA network(s) is idle for at least one DIFS interval at the beginning of the POLL packet's transmission, or (b) if 802.11 is the only active network and there is no 802.11 uplink data to receive at the MPD during the POLL packet's transmission, or (c) if 802.11 is the only active network, there is 802.11 uplink data to receive during the POLL packet's transmission, and the MPD has been successful in transmitting at least T of the last ten POLL packets in the 802.11 band to the BT terminal during an active 802.11 uplink transmission, where T is an appropriate threshold. If conditions (1) and (2) are not met, the MPD waits at least 2 slots before attempting to use the above procedure again to receive uplink data.

The interference avoidance procedures described above are useful individually or in combination. Moreover, each procedure or method may be embodied as a controller (one or more general or special purpose processors) configured or programmed to perform the various steps thereof, or as software stored on a processor readable memory containing instructions that, when executed by a processor, causes the processor to perform the various steps thereof.

The above description is intended by way of example only.

What is claimed is:

1. A method for controlling communication among a plurality of wireless communication devices in a frequency band in which communication between communication devices occurs using first and second communication protocols, at least the first communication protocol using at least one time period during which communication is governed by rules of carrier sense multiple access, the method comprising the step of:

transmitting a guard packet from a first communication device in accordance with the first communication protocol, the guard packet being formatted to alert and inform communication devices that use the first communication protocol to refrain from communication for a period of time in the frequency band to enable transmission of information from, or reception of information by, the first communication device in accordance with the second communication protocol during the period of time without colliding with signals in the frequency band on the first communication protocol.

2. The method of claim 1, wherein the step of transmitting the guard packet comprises transmitting a header comprising a data portion and a duration identifier portion, the data portion having a bit pattern that is recognized by communication devices using the first communication protocol to enter a back-off state and the duration identifier portion is recognized by communication devices using the first communication protocol to refrain from communicating using the first communication protocol for a period of time precisely sufficient to permit the transmission of a packet of information using the second communication protocol.

3. The method of claim 2, wherein the step of transmitting the header comprises transmitting a data portion comprising a bit pattern that continues for a period of time sufficient to cover a time duration of at least one fragment of information according to the first communication protocol and one acknowledgment message according to the second communication protocol.

4. The method of claim 2, wherein the step of transmitting the guard packet further comprises transmitting a trailer portion after the header portion to further prevent communication devices using the first communication protocol from communicating in the frequency band for a period of time sufficient to allow the first communication device to transmit or receive the information in accordance with the second communication protocol.

5. The method of claim 1, and further comprising the step of filtering out energy in a frequency segment of the trailer portion of the guard packet that is transmitted by the first communication device to prevent interference with a signal to be received by the first communication device using the second communication protocol.

6. The method of claim 4, and further comprising the step of transmitting information from the first communication device in accordance with the first communication protocol during the trailer portion of the guard packet.

7. The method of claim 1, wherein the step of transmitting the guard packet comprises transmitting a header comprising a sequence of a predetermined number of clear-to-send (CTS) packets that alert other communication devices using the first communication protocol not to transmit in the frequency band, each CTS packet comprising a duration identifier to inform communication devices using the first communication protocol to refrain from communication for a period of time, the value of the duration identifier depending on the place in the sequence of a particular CTS packet.

8. The method of claim 7, wherein the step of transmitting the header comprises transmitting N CTS packets, wherein the duration identifier of a CTS(i) packet has a value determined by the sum of the time duration of a packet of information to be transmitted using the second communication protocol in the frequency band and (N−i)*L, wherein L is the duration of a CTS packet and i is the index of the CTS packet in the sequence.

9. The method of claim 8, wherein the step of transmitting the header comprises transmitting N CTS packets, where N is equal to the smallest integer greater than F/L+1, where F is the longest duration of a fragment of information that is transmitted using the first communication protocol.

10. The method of claim 9, wherein the first communication device transmits the sequence of CTS packets when the first communication device is requested to receive information from a communication device using the second communication protocol.

11. The method of claim 1, wherein the step of transmitting the guard packet comprises transmitting a header comprising a sequence of a predetermined number of subpackets, each subpacket comprising a request-to-send (RTS) packet and a silent period, the silent period lasting for a time period based on the length of a clear-to-send send (CTS) packet according to the first communication protocol, and wherein the RTS packet comprises a duration identifier to inform an access point device for the first communication protocol to transmit a CTS packet in order to inform communication devices using the first communication protocol to refrain from communication for a period of time, the value of the duration identifier in a RTS packet depending on the place in the sequence of a particular RTS packet.

12. The method of claim 11, wherein the step of transmitting the header comprises transmitting N subpackets, and wherein the duration identifier of a RTS(i) subpacket has a value determined by the sum of the time duration of a packet of information to be transmitted using the second communication protocol in the frequency band and (N−i)*L+M, wherein L is the duration of a subpacket, i is the index of the subpacket in the sequence and M is the duration of a clear-to-send packet.

13. The method of claim 12, wherein the step of transmitting the header comprises transmitting N subpackets, where N is equal to the smallest integer greater than (F/L)+1, where F is the longest duration of a fragment of information that is transmitted using the first communication protocol.

14. The method of claim 1, wherein the first communication protocol is a fixed frequency wireless communication protocol and the second communication protocol is a frequency hopping wireless communication protocol in which time slots of information are sent with signals at different frequencies in the frequency band and may at least partially overlap in frequency with signals of the first communication protocol.

15. The method of claim 14, wherein the first communication protocol is the IEEE 802.11 communication protocol and versions thereof, and the second communication protocol is the Bluetooth™ communication protocol and versions thereof.

16. The method of claim 1, wherein the first communication protocol uses a plurality of time frames each containing a plurality of time intervals, each time interval having a variable time duration and being dedicated to functions determined by rules of the first communication protocol, wherein each time frame is transmitted at a different frequency in the band and wherein the time frame comprises at least one contention time interval during which communication devices in the frequency band using the first communication protocol contend for access to transmit information using carrier sense multiple access procedures, and further comprising the step of determining when a time slot of information to be transmitted using the second communication protocol will at least partially overlap with the contention time interval as a condition precedent to said step of transmitting the guard packet.

17. The method of claim 1, wherein the first communication protocol is a fixed frequency wireless communication protocol and the second communication protocol uses a plurality of time frames each containing a plurality of time intervals, each time interval having a variable time duration and being dedicated to functions determined by rules of the second communication protocol, wherein each time frame is transmitted at a different frequency in the band and wherein the time frame comprises at least one contention free time interval during which synchronous type data is transmitted between communication devices using the second communication protocol, wherein the step of transmitting a guard packet is performed when it is determined that information is to be transmitted during the at least one contention free time interval.

18. The method of claim 1, and further comprising step of transmitting information from, or receiving information at, the first communication device using the second conimunication protocol, wherein the information transmitted from or received by the first communication device comprises synchronous type data.

19. The method of claim 1, and further comprising the step of transmitting control parameters from the first communication to the plurality of communication devices for managing communication in the frequency band using the first and second communication protocols.

20. The method of claim 19, and further comprising the step of generating the control parameters in the first communication device to adjust a maximum fragment size of information transmitted by communication devices using the first communication protocol to manage throughput of synchronous type data using the second communication protocol, so as to minimize a required duration of the guard packet which in turn minimizes impact on throughput of information using the first communication protocol when synchronous type data is to be transmitted using the second communication protocol.

21. The method of claim 19, wherein the first communication device generates control parameters to dynamically adjust the amount of access to the frequency band for synchronous type data based on network loading conditions in the frequency band measured by the first communication device.

22. The method of claim 1, wherein the first communication device measures the activity in the frequency band to determine whether and which communication protocols are active in the band, whereby prior to transmitting a guard packet, the first communication device determines whether a transmission of information on the second communication protocol at least partially overlaps in frequency with a transmission of information on the first communication protocol in the frequency band.

23. A method for controlling communication among a plurality of wireless communication devices in a frequency band in which communication between communication devices occurs using first and second communication protocols, at least the first communication protocol using at least on time period that operates on rules of carrier sense multiple access, the method comprising steps of:

at a first communication device, monitoring activity in the band to determine in which frequencies and whether communication occurs using the first and second communication protocols;

when information is to be sent from the first communication device to another, or information is to be sent to the first communication device from another communication device, using the second communication protocol, determining whether a frequency of the signal be transmitted using the second communication protocol at least partially overlaps with the frequency range of signals transmitted in the frequency band using the first communication protocol;

if it is determined that the signal to be transmitted using the second communication protocol may collide with signals in the frequency band on the first communication protocol, then transmitting a guard packet from the first communication device in accordance with the first communication protocol, the guard packet being formatted to alert and inform the first set of communication devices to refrain from communication for a period of time in the frequency band to enable transmission of information from, or reception of information by, the first communication device in accordance with the second communication protocol in the frequency band.

24. The method of claim 23, wherein the step of transmitting the guard packet comprises transmitting a header comprising a data portion and a duration identifier portion, the data portion having a bit pattern that is recognized by communication devices using the first communication protocol to enter a back-off state and the duration identifier portion is recognized by communication devices using the first communication protocol to refrain from communicating using the first communication protocol for a period of time precisely sufficient to permit the transmission of a packet of information using the second communication protocol.

25. The method of claim 24, wherein the step of transmitting the header comprises transmitting a data portion comprising a bit pattern that continues for a period of time sufficient to cover a time duration of at least one fragment of information according to the first communication protocol and one acknowledgment message according to the second communication protocol.

26. The method of claim 24, wherein the step of transmitting the guard packet further comprises transmitting a trailer portion after the header portion to further prevent communication devices using the first communication protocol from communicating in the frequency band for a period of time sufficient to allow the first communication device to transmit or receive the information in accordance with the second communication protocol.

27. The method of claim 26, and further comprising the step of filtering out energy in a frequency segment of the trailer portion of the guard packet that is transmitted by the first communication device to prevent interference with a signal to be transmitted by the first communication device using the second communication protocol.

28. The method of claim 26, and further comprising step of filtering out energy in a frequency segment of the trailer portion of the guard packet that is transmitted by the first communication device to prevent interference with a signal to be received by the first communication device using the second communication protocol.

29. The method of claim 26, and further comprising the step of transmitting information from the first communication device in accordance with the first communication protocol during the trailer portion of the guard packet.

30. The method of claim 23, wherein the step of transmitting the guard packet comprises transmitting a header comprising a sequence of a predetermined number of clear-to-send (CTS) packets that alert other communication devices using the first communication protocol not to transmit in the frequency band, each CTS packet comprising a duration identifier to inform communication devices using the first communication protocol to refrain from communication for a period of time, the value of the duration identifier depending on the place in the sequence of a particular CTS packet.

31. The method of claim 30, wherein the step of transmitting the header comprises transmitting N CTS packets, wherein the duration identifier of a CTS(i) packet has a value determined by the sum of the time duration of a packet of information to be transmitted using the second communication protocol in the frequency band and $(N-i)*L$, wherein L is the duration of a CTS packet and i is the index of the CTS packet in the sequence.

32. The method of claim 31, wherein the step of transmitting the header comprises transmitting N CTS packets, where N is equal to the smallest integer greater than $F/L+1$, where F is the longest duration of a fragment of information that is transmitted using the first communication protocol.

33. The method of claim 32, wherein the first communication device transmits the sequence of CTS packets when the first communication device is requested to receive information from a communication device using the second communication protocol.

34. The method of claim 23, wherein the step of transmitting the guard packet comprises transmitting a header comprising a sequence of a predetermined number of subpackets, each subpacket comprising a request-to-send (RTS) packet and a silent period, the silent period lasting for a time period based on the length of a clear-to-send packet, and wherein the RTS packet comprises a duration identifier that is received by an access point device for the first communication protocol to transmit a CTS packet in order to inform communication devices using the first communication protocol to refrain from communication for a period of time, the value of the duration identifier in a RTS packet depending on the place in the sequence of a particular RTS packet.

35. The method of claim 34, wherein the step of transmitting the header comprises transmitting N subpackets, and wherein the duration identifier of a RTS(i) subpacket has a value determined by the sum of the time duration of a packet of information to be transmitted using the second communication protocol in the frequency band and $(N-i)*L+M$, wherein L is the duration of a subpacket, i is the index of the subpacket in the sequence and M is the duration of a clear-to-send packet.

36. The method of claim 35, wherein the step of transmitting the header comprises transmitting N subpackets, where N is equal to the smallest integer greater than $(F/L)+1$, where F is the longest duration of a fragment of information that is transmitted using the first communication protocol.

37. The method of claim 23, wherein the first communication protocol is a fixed frequency wireless communication protocol and the second communication protocol is a frequency hopping wireless communication protocol in which time slots of information are sent with signals at different frequencies in the frequency band and may at least partially overlap in frequency with signals of the first communication protocol.

38. The method of claim 37, wherein the first communication protocol is the IEEE 802.11 communication protocol and versions thereof, and the second communication protocol is the Bluetooth™ communication protocol and versions thereof.

39. The method of claim 23, wherein the first communication protocol uses a plurality of time frames each containing a plurality of time intervals, each time interval having a variable time duration and being dedicated to functions determined by rules of the first communication protocol, wherein each time frame is transmitted at a different frequency in the band and wherein the time frame comprises at least one contention time interval during which communication devices in the frequency band using the first communication protocol contend for access to transmit information using carrier sense multiple access procedures, and further comprising the step of determining when a time slot of information to be transmitted using the second communication protocol will at least partially overlap with the contention time interval as a condition precedent to said step of transmitting the guard packet.

40. The method of claim 23, wherein the first communication protocol is a fixed frequency wireless communication protocol and the second communication protocol uses a plurality of time frames each containing a plurality of time intervals, each time interval having a variable time duration and being dedicated to functions determined by rules of the second communication protocol, wherein each time frame is transmitted at a different frequency in the band and wherein the time frame comprises at least one contention free time interval during which synchronous type data is transmitted between communication devices using the second communication protocol, wherein the step of transmitting a guard packet is performed when it is determined that information is to be transmitted during the at least one contention free time interval.

41. The method of claim 23, and further comprising step of transmitting information from, or receiving information at, the first communication device using the second communication protocol, wherein the information transmitted from or received by the first communication device comprises synchronous type data.

42. The method of claim 41, and further comprising the step of transmitting control parameters from the first communication to the plurality of communication devices for managing communication in the frequency band using the first and second communication protocols.

43. The method of claim 42, and further comprising the step of generating the control parameters in the first communication device to adjust a maximum fragment size of information transmitted by communication devices using the first communication protocol to manage throughput of synchronous type data using the second communication protocol, so as to minimize a required duration of the guard packet which in turn minimizes impact on throughput of information using the first communication protocol when synchronous type data is to be transmitted using the second communication protocol.

44. The method of claim 42, wherein the first communication device generates control parameters to dynamically adjust the amount of access to the frequency band for synchronous type data based on data loading in the frequency band measured by the first communication device.

45. The method of claim 23, wherein the first communication device measures the activity in the frequency band to determine whether and which communication protocols are active in the band, whereby prior to transmitting a guard packet, the first communication device determines whether a transmission of information on the second communication protocol at least partially overlaps in frequency with a transmission of information on the first communication protocol in the frequency band.

46. A controller for use in a wireless communication device that operates in a communication system that allows for communication among a plurality of wireless communication devices in a common frequency band in which communication between communication devices occurs using first and second communication protocols, at least the first communication protocol using at least one time period that operates on rules of carrier sense multiple access, the controller being configured or programmed to perform the step of:

generating a guard packet for transmission from the communication device in accordance with the first communication protocol, the guard packet being formatted to alert and inform communication devices that use the first communication protocol to refrain from communication for a period of time in the frequency band to enable transmission of information from, or reception of information by, the communication device in accordance with the second communication protocol during the period of time without colliding with signals from communication devices using the first communication protocol.

47. The controller of claim 46, wherein the controller is configured or programmed to generate the guard packet by generating a header comprising a data portion and a duration identifier portion, the data portion having a bit pattern that is recognized by communication devices using the first communication protocol to enter a back-off state and the duration identifier portion is recognized by communication devices using the first communication protocol to refrain from communicating using the first communication protocol for a period of time precisely sufficient to permit the transmission of a packet of information using the second communication protocol.

48. The controller of claim 47, wherein the controller is configured or programmed to generate the header by generating a data portion comprising a bit pattern that continues for a period of time sufficient to cover a time duration of at least one fragment of information according to the first communication protocol and one acknowledgment message according to the second communication protocol.

49. The controller of claim 47, wherein the controller is configured or programmed to generate the guard packet by further generating a trailer portion after the header portion to further prevent communication devices using the first communication protocol from communicating in the frequency band for a period of time sufficient to allow the communication device to transmit or receive the information in accordance with the second communication protocol.

50. The controller of claim 49, wherein the controller is configured or programmed to filter out energy in a frequency segment of the trailer portion of the guard packet that is transmitted by the communication device to prevent interference with a signal to be transmitted by the communication device using the second communication protocol.

51. The controller of claim 49, wherein the controller is configured or programmed to filter out energy in a frequency segment of the trailer portion of the guard packet that is transmitted by the communication device to prevent interference with a signal to be received by the communication device using the second communication protocol.

52. The controller of claim 49, wherein the controller is configured or programmed to supply information for transmission from the communication device in accordance with the first communication protocol during the trailer portion of the guard packet.

53. The controller of claim 46, wherein the controller is configured or programmed to generate the guard packet by generating a header comprising a sequence of a predetermined number of clear-to-send (CTS) packets that alert other communication devices using the first communication protocol not to transmit in the frequency band, each CTS packet comprising a duration identifier to inform communication devices using the first communication protocol to refrain from communication for a period of time, the value of the duration identifier depending on the place in the sequence of a particular CTS packet.

54. The controller of claim 53, wherein the controller is configured or programmed to generate the header by generating N CTS packets, wherein the duration identifier of a CTS(i) packet has a value determined by the sum of the time duration of a packet of information to be transmitted using the second communication protocol in the frequency band and $(N-i)*L$, wherein L is the duration of a CTS packet and i is the index of the CTS packet in the sequence.

55. The controller of claim 54, wherein the controller is configured or programmed to generate the header by generating N CTS packets, where N is equal to the smallest integer greater than $F/L+1$, where F is the longest duration of a fragment of information that is transmitted using the first communication protocol.

56. The controller of claim 55, wherein the controller is configured or programmed to generate the sequence of CTS packets when the communication device is requested to receive information from a communication device using the second communication protocol.

57. The controller of claim 46, wherein the controller is configured or programmed to generate the guard packet by generating a header comprising a sequence of a predetermined number of subpackets, each subpacket comprising a request-to-send (RTS) packet and a silent period, the silent period lasting for a time period based on the length of a clear-to-send (CTS) packet according to the first communication protocol, and wherein the RTS packet comprises a duration identifier to inform an access point device for the first communication protocol to transmit a CTS packet in order to inform communication devices using the first communication protocol to refrain from communication for a period of time, the value of the duration identifier in a RTS packet depending on the place in the sequence of a particular RTS packet.

58. The controller of claim 57, wherein the controller is configured or programmed to generate the header by generating N subpackets, and wherein the duration identifier of a RTS(i) subpacket has a value determined by the sum of the time duration of a packet of information to be transmitted using the second communication protocol in the frequency band and $(N-i)*L+M$, wherein L is the duration of a subpacket, i is the index of the subpacket in the sequence and M is the duration of a clear-to-send packet.

59. The controller of claim 58, wherein the controller is configured or programmed to generate the header by generating N subpackets, where N is equal to the smallest integer greater than $(F/L)+1$, where F is the longest duration of a fragment of information that is transmitted using the first communication protocol.

60. The controller of claim 46, wherein the first communication protocol uses a plurality of time frames each containing a plurality of time intervals, each time interval having a variable time duration and being dedicated to functions determined by rules of the first communication protocol, wherein each time frame is transmitted at a different frequency in the band and wherein the time frame comprises at least one contention time interval during which communication devices in the frequency band using the first communication protocol contend for access to transmit information using carrier sense multiple access procedures, and wherein the controller is configured or programmed to determine when a time slot of information to be transmitted using the second communication protocol will at least partially overlap with the contention time interval as a condition precedent to said step of transmitting the guard packet.

61. The controller of claim 46, wherein the first communication protocol is a fixed frequency wireless communication protocol and the second communication protocol uses a plurality of time frames each containing a plurality of time intervals, each time interval having a variable time duration and being dedicated to functions determined by rules of the second communication protocol, wherein each time frame is transmitted at a different frequency in the band and wherein the time frame comprises at least one contention free time interval during which synchronous type data is transmitted between communication devices using the second communication protocol, wherein the controller is configured or programmed to generate a guard packet when it is determined that information is to be transmitted during the at least one contention free time interval.

62. The controller of claim 46, wherein the controller is configured or programmed to supply information for transmission from, or receive information transmitted to, the communication device using the second communication protocol, wherein the information transmitted from or received by the communication device comprises synchronous type data.

63. The controller of claim 62, wherein the controller is configured or programmed so that the communication device transmits control parameters to the plurality of communication devices for communication in the frequency band using the first and second communication protocols.

64. The controller of claim 63, wherein the controller is configured or programmed to generate control parameters to adjust a maximum fragment size of information transmitted by communication devices using the first communication protocol to manage throughput of synchronous type data using the second communication protocol, so as to minimize a required duration of the guard packet which in turn minimizes impact on throughput of information using the first communication protocol when synchronous type data is to be transmitted using the second communication protocol.

65. The controller of claim 64, wherein the controller is configured or programmed to generate control parameters to dynamically adjust the amount of access to the frequency band for synchronous type data based on network loading in the frequency band measured by the conmunication device.

66. The controller of claim 46, wherein the controller is configured or programmed process signals representing a measure of activity in the frequency band to determine whether and which communication protocols are active in the band, whereby prior to generating a guard packet for transmission, the controller determines whether a transmission of information on the second communication protocol at least partially overlaps in frequency with a transmission of information on the first communication protocol in the frequency band.

67. A software product stored on a processor readable memory containing instructions that, when executed by a processor, causes the processor to perform steps of:
generate a guard packet for transmission from a communication device in accordance with a first communication protocol, the guard packet being formatted to alert and inform communication devices using the first communication protocol to refrain from communication for a period of time in a frequency band to enable transmission of information from, or reception of information by, the communication device in accordance with a second communication protocol during the period of time without colliding with signals in the frequency band.

68. The software product of claim 67, wherein the instructions for causing the processor to generate the guard packet further comprise instructions to generate a header comprising a data portion and a duration identifier portion, the data portion having a bit pattern that is recognized by communication devices using the first communication protocol to enter a back-off state and the duration identifier portion is recognized by communication devices using the first communication protocol to refrain from communicating using the first communication protocol for a period of time precisely sufficient to permit the transmission of a packet of information using the second communication protocol.

69. The software product of claim 68, wherein the instructions for causing the processor to generate the header comprises instructions for generating a data portion comprising a bit pattern that continues for a period of time sufficient to cover a time duration of at least one fragment of information according to the first communication protocol and one acknowledgment message according to the second communication protocol.

70. The software product of claim 67, wherein the instructions for causing the processor to generate the guard packet further comprise instructions for generating a trailer portion after the header portion to further prevent communication devices using the first communication protocol from communicating in the frequency band for a period of time sufficient to allow the first communication device to transmit or receive the information in accordance with the second communication protocol.

71. The software product of claim 67, wherein the instructions for causing the processor to generate the guard packet further comprise instructions for generating a header comprising a sequence of a predetermined number of clear-to-send (CTS) packets that alert other communication devices using the first communication protocol not to transmit in the frequency band, each CTS packet comprising a duration identifier to inform communication devices using the first communication protocol to refrain from communication for a period of time, the value of the duration identifier depending on the place in the sequence of a particular CTS packet.

72. The software product of claim 67, wherein the instructions for causing the processor to generate the guard packet further comprise instructions for generating a header comprising a sequence of a predetermined number of subpackets, each subpacket comprising a request-to-send (RTS) packet and a silent period, the silent period lasting for a time period based on the length of a clear-to-send (CTS) packet according to the first communication protocol, and wherein the RTS packet comprises a duration identifier to inform an access point device for the first communication protocol to transmit a CTS packet in order to inform communication devices using the first communication protocol to refrain from communication for a period of time, the value of the duration identifier in a RTS packet depending on the place in the sequence of a particular RTS packet.

73. A method for controlling communication among a plurality of wireless communication devices in a frequency band in which communication between communication devices occurs using first and second communication protocols, wherein the first communication protocol uses at least one fixed frequency range in the frequency band and the second communication protocol uses a frequency that changes for each of a plurality of time slots of information that are transmitted in the frequency band, the method comprising steps of:
at a first communication device having information to be transmitted using the second communication protocol, prior to transmission of a plurality of time slots in the frequency band using the second communication protocol, determining frequencies associated with each of the plurality of time slots;
determining whether the frequencies associated with the plurality of time slots of the second communication protocol at least partially overlap with the at least one frequency range used by the first communication protocol in the frequency band; and
transmitting information using the second communication protocol from the first communication device using up to a maximum number of time slots whose frequencies do not at least partially overlap with the frequency range of the first communication protocol in the frequency band.

74. The method of claim 73, wherein the step of determining comprises determining whether the frequencies associated with one or more of the plurality of time slots for information to be transmitted from the first communication device to another communication device and the frequency associated with the time slot for a corresponding acknowledgment message to be transmitted from the other communication device to the first communication device using the second communication protocol each at least partially overlap with the frequency range of the first communication protocol.

75. The method of claim 74, wherein the step of determining comprises determining whether the frequencies associated with a maximum number of time slots associated with the second communication protocol and the frequency of an acknowledgment message time slot at least partially overlap with the frequency range of the first communication protocol, and if an overlap of is determined, then further determining whether frequencies associated with a lesser number of time slots associated with the second communication protocol and the frequency of an acknowledgment message time slot at least partially overlap with the frequency range of the first communication protocol.

76. The method of claim 75, wherein if it is determined that either the frequencies associated with each of the time slots in the plurality of time slots for transmission of information from the first communication device or the frequency associated with an acknowledgment message time slot at least partially overlap with the frequency range of the first communication protocol, then determining a minimum number of time slots whose frequencies at least partially overlap with the frequency range of the first communication protocol but whose corresponding acknowledgment message time slot does not overlap with the frequency range of the first communication protocol.

77. The method of claim 76, wherein the step of transmitting comprises transmitting information from the first communication device using the second communication protocol in said minimum number of time slots if any one of the following conditions are satisfied:

(a) communication in the frequency band using the first communication protocol is idle for a first period of time; or (b) the first communication device is configured to prevent communication of information using the first communication protocol during the time period that information in said minimum number of time slots will be transmitted; or (c) the first communication device has been successful in a transmitting information in a predetermined percentage of a number of previous time slots using the second communication protocol, where the frequencies of the previous time slots at least partially overlap with the frequency range of the first communication protocol and where the first communication device was receiving information using the first communication protocol while it was transmitting information in the previous time slots.

78. The method of claim 77, wherein if it is determined that there is no minimum number of time slots that satisfies said conditions, then delaying at least two time slots before attempting to transmit information using the second information protocol.

79. The method of claim 73, wherein the first communication device receives a signal transmitted to it in accordance with the first communication protocol while transmitting a signal in accordance with the second communication protocol.

80. The method of claim 79, wherein the first communication device filters out a frequency segment of the signal received in accordance with the first communication protocol corresponding to the transmission frequency of a time slot of a signal in accordance with the second communication protocol.

81. The method of claim 73, wherein the first communication device transmits a signal using the first communication protocol while transmitting a signal using the second communication protocol.

82. The method of claim 81, wherein the first communication device filters out a frequency segment of the signal to be transmitted in accordance with the first communication protocol corresponding to the transmission frequency of a time slot of a signal in accordance with the second communication protocol.

83. The method of claim 74, wherein the step of determining further comprises determining whether the frequency of the acknowledgment message time slot at least partially overlaps with an adjacent frequency range which is located adjacent to said frequency range of the first communication protocol, in which adjacent frequency range energy may be present due to non-linear distortion of a transmitter and/or receiver operating on signals using the first communication protocol.

84. The method of claim 83, wherein if it is determined that the frequency of the acknowledgment message time slot at least partially overlaps with the adjacent frequency range, then further determining whether a signal level of the acknowledgment message is greater by a predetermined amount than a level of energy in the adjacent frequency range at a corresponding frequency.

85. The method of claim 84, wherein the step of transmitting information using the second communication protocol is conditioned on whether the signal level of the acknowledgment message that at least partially overlaps with the adjacent frequency range is greater than the level of energy in the adjacent frequency band at a corresponding frequency.

86. The method of claim 73, at the first communication device, further comprising the step of determining whether communication in the frequency band using the first communication protocol is idle or sufficiently small, and if so, then said step of transmitting information using the second communication protocol from the first communication device using said maximum number of time slots being performed without regard to whether the frequency of a time slot at least partially overlaps with the frequency range of the first communication protocol.

87. The method of claim 73, wherein the first communication protocol is the IEEE 802.11 protocol and versions thereof and the second communication protocol is the Bluetooth™ protocol and versions thereof.

88. The method of claim 73, wherein the information to be transmitted on the second communication protocol is asynchronous type data.

89. The method of claim 73, wherein communication in the frequency band further occurs using a third communication protocol which operates during a plurality of time frames each of which includes a plurality of time intervals each of a variable time duration and dedicated to functions determined by rules of the third communication protocol and wherein each time frame is transmitted at a different frequency in the frequency band, wherein the time frame comprises at least one contention free time interval during which synchronous type data is transmitted between devices, wherein the step of determining further comprises determining whether a contention free time interval of a time frame associated with the third communication protocol overlaps in frequency and time with that of a time slot associated with the second communication protocol.

90. The method of claim 89, wherein the step of transmitting information using the second communication protocol is performed for up to a maximum number of time slots, whose frequencies do not at least partially overlap with the frequency range of the first communication protocol and whose scheduled time occurrence and frequency do not overlap with a contention free time interval of a time frame of the third communication protocol.

91. The method of claim 89, and further comprising storing information in a table that has an entry for each time slot of the second communication protocol that does not contain synchronous type data and which is determined to at least partially overlap in frequency with the contention free time interval of a time frame associated with the third communication protocol, wherein the value of an entry in the table indicates whether there is overlap between a time slot and a contention free time interval of a time frame.

92. The method of claim 91, and further comprising the step of determining the largest number of consecutive time slots whose frequencies do not at least partially overlap with the frequency range of the first communication protocol and whose values in the table indicate no overlap with the contention free time interval of a time frame according to the third communication protocol, and wherein the step of transmitting comprises transmitting information in said largest number of consecutive time slots according to the second communication protocol.

93. A controller for use in a wireless communication device that controls communication among a plurality of wireless communication devices in a frequency band in which communication between communication devices occurs using first and second communication protocols, wherein the first communication protocol uses at least one fixed frequency range in the frequency band and the second communication protocol uses a frequency that changes for each of a plurality of time slots of information that are transmitted in the frequency band, the controller being configured or programmed to perform the steps of:

prior to transmission of a plurality of time slots in the frequency band using the second communication protocol from the communication device, determining frequencies associated with each of the plurality of time slots;

determining whether the frequencies associated with the plurality of time slots of the second communication protocol at least partially overlap with the at least one frequency range used by the first communication protocol in the frequency band; and assigning information to be transmitted from the communication device using the second communication protocol in up to a maximum number of time slots whose frequencies do not at least partially overlap with the frequency range of the first communication protocol in the frequency band.

94. A software product stored on a processor readable memory containing instructions that, when executed by a processor, causes the processor to perform steps of:

determining frequencies associated with each of a plurality of scheduled time slots according to a second communication protocol, wherein a frequency for each time slot may be different within a frequency band;

determining whether the frequencies associated with the plurality of time slots of the second communication protocol at least partially overlap with the at least one frequency range used by a first communication protocol in the frequency band; and assigning information to be transmitted using the second communication protocol in up to a maximum number of time slots whose frequencies do not at least partially overlap with the frequency range of the first communication protocol in the frequency band.

95. A method for controlling communication among a plurality of wireless communication devices in a common frequency band in which communication between communication devices occurs using first and second communication protocols, wherein the first communication protocol uses at least one fixed frequency range in the frequency band and the second communication protocol uses a frequency that changes for each of a plurality of time slots of information that is transmitted in the frequency band, a method for transmitting information from a second communication device to a first communication device using the second communication protocol, comprising steps of:

at the first communication device, determining whether a frequency of a poll packet to be transmitted from the first communication device to the second communication device and a frequency of one or more time slots to transmit information from the second communication device to the first communication device at least partially overlap with the frequency range of the first communication protocol;

transmitting a poll packet to the second communication device from the first communication device if it is determined that the frequency of the poll packet and the frequency of the one or more time slots do not at least partially overlap with the frequency range of the first communication protocol; and at the second communication device, in response to receiving the poll packet, transmitting information to the first communication device using one or more time slots according to the second communication protocol.

96. The method of claim 95, wherein if the frequency for the poll packet at least partially overlaps with the frequency range of the first communication protocol and the frequency of the one or more time slots do not at least partially overlap with the frequency range of the first communication protocol, then transmitting the poll packet from the first communication device to the second communication device if any one of the following conditions are satisfied:

(a) communication in the frequency band using the first communication protocol is determined to be idle for a first period of time; or (b) there is no information to be transmitted to the first communication device during a time period that the first communication device is to transmit the poll packet; or (c) the first communication device has been successful in a transmitting a predetermined percentage of a number of previous poll packets using the second communication protocol, where the frequencies of the previous time slots at least partially overlap with the frequency range of the first communication protocol and where the first communication device was receiving information using the first communication protocol while it was transmitting the poll packets.

97. A method for controlling communication among a plurality of wireless communication devices in a frequency band in which communication between communication devices occurs using first and second communication protocols, wherein communication using the first communication uses a plurality of time frames each of which includes a plurality of time intervals each of a variable time duration and dedicated to functions determined by rules of the first communication protocol, including a contention free time interval being dedicated to transmission of synchronous data, and wherein each time frame is transmitted at a different frequency in the frequency band, and wherein the second communication protocol uses a frequency that changes for each of a plurality of time slots of information that are transmitted in the frequency band, a method for preventing transmission of information in a time frame according to the first communication protocol from colliding with transmission of time slots of information using the second communication protocol, in a communication device, the method comprising steps of:

prior to transmission of at least one time frame of information in the frequency band using the first communication protocol, determining a frequency of the at least one time frame;

prior to transmissions of a plurality of time slots in the frequency band using the second communication protocol, determining frequencies associated with each of the plurality of time slots that are scheduled to transmit synchronous data;

determining whether any of the plurality of time slots scheduled to transmit synchronous data using the second communication protocol at least partially overlap in frequency and time with the contention free time interval of the time frame of information to be transmitted using the first communication protocol;

setting values for the durations and/or start times of one or more time intervals in the time frame of information to be transmitted using the first communication protocol so as to prohibit any communication device in the frequency band from transmitting information using the first communication protocol during the contention free time interval that would at least partially overlap with the transmission of one or more time slots scheduled to transmit synchronous data.

98. The method of claim 97, wherein a beacon time interval in the time frame associated with the first communication protocol is used to transmit information describing parameters for the time intervals in that time frame, wherein the step of setting values comprises setting values for information in the beacon time interval to prevent the contention free time interval from overlap in time with the one or more time slots scheduled to transmit synchronous data.

99. The method of claim 98, wherein the step of setting values for the time intervals in the time frame comprises inserting one or more non-information bearing time segments in the time frame to move the contention free time interval to a position in the time frame that does not overlap in time with the one or more time slots scheduled to transmit synchronous data.

100. The method of claim 97, wherein if it is not possible to move the contention free time interval away from the one or more time slots that are scheduled to transmit synchronous data, then further comprising the step of alternating priority between transmission of the one or more time slots and transmission of the first contention free time interval with respect to similar collisions that occurred in prior time frames and similar collisions that may occur in future time frames.

101. A controller for use in a wireless communication device that controls communication among a plurality of communication devices in a frequency band in which communication between communication devices occurs using first and second communication protocols, wherein communication using the first communication uses a plurality of time frames each of which includes a plurality of time intervals each of a variable time duration and dedicated to functions determined by rules of the first communication protocol, including a contention free time interval being dedicated to transmission of synchronous data, and wherein each time frame is transmitted at a different frequency in the frequency band, and wherein the second communication protocol uses a frequency that changes for each of a plurality of time slots of information that are transmitted in the frequency band, a method for preventing transmission of information in a time frame according to the first communication protocol from colliding with transmission of time slots of information using the second communication protocol, by performing steps of:

determining a frequency of the at least one time frame prior to scheduled transmission of at least one time frame of information in the frequency band using the first communication protocol;

determining frequencies associated with each of the plurality of time slots prior to scheduled transmissions of a plurality of time slots in the frequency band using the second communication protocol;

determining whether any of the plurality of time slots scheduled to transmit synchronous data using the second communication protocol at least partially overlap in frequency and time with the contention free time interval of the time frame of information to be transmitted using the first communication protocol;

setting values for the durations and/or start times of one or more time intervals in the time frame of information to be transmitted using the first communication protocol so as to prohibit any communication device in the frequency band from transmitting information using the first communication protocol during the contention free time interval that would at least partially overlap with the transmission of one or more time slots scheduled to transmit synchronous data.

102. A software product stored on a processor readable memory containing instructions that, when executed by a processor, causes the processor to perform steps of:

determining a frequency of at least one time frame prior to scheduled transmission of at least one time frame of information in a frequency band using a first communication protocol, wherein the first communication protocol uses a plurality of time frames each of which includes a plurality of time intervals each of a variable time duration and dedicated to functions determined by rules of the first communication protocol, a contention free time interval being dedicated for transmission of synchronous data, and wherein each time frame is transmitted at a different frequency in the frequency band;

determining frequencies associated with each of the plurality of time slots prior to scheduled transmissions of a plurality of time slots in the frequency band using a second communication protocol, wherein the second communication protocol uses a frequency that changes for each of a plurality of time slots of information that are transmitted in the frequency band;

determining whether any of the plurality of time slots scheduled for transmission of synchronous data at least partially overlap in frequency and time with the contention free time interval;

setting values for the durations and/or start times of one or more time intervals in the time frame of information to be transmitted using the first communication protocol so as to prohibit any communication device in the frequency band from transmitting information during the contention free time interval when it is determined that one or more time slots scheduled to transmit synchronous data overlap in frequency and time with the contention free time interval for a time frame.

103. A method for controlling communication among a plurality of wireless communication devices in a frequency band in which communication between communication devices concurrently occurs using first and second communication protocols, wherein communication according to the first communication protocol occurs during a plurality of time frames each of which includes a plurality of time intervals each of a variable time duration and dedicated to functions determined by rules of the first communication protocol, a particular time interval in a time frame being dedicated for communication of synchronous type data, and wherein each time frame is transmitted at a different frequency in the band, and wherein the second communication uses a frequency that changes for each of a plurality of time slots of information that are transmitted in the frequency band and wherein one or more time slots are dedicated for communication of synchronous type data, a method for preventing transmission of information in a time frame according to the first communication protocol from colliding with transmissions of time slots of information using the second communication protocol, the method comprising steps of:

at a communication device, prior to a scheduled transmission of at least one time frame of information using the first communication protocol and to transmissions of a corresponding plurality of time slots using the second communication protocol, determining whether any of the plurality of time slots to be transmitted using the second communication protocol at least partially overlap in time with said particular time interval in the time frame;

identifying those time slots to be transmitted using the second communication protocol that at least partially overlap with said particular time interval of the time frame;

determining frequencies for each of the plurality of time slots to be transmitted using the second communication protocol;

for each time slot whose frequency will at least partially overlap with a frequency of the time frame and will at least partially overlap in time with said particular time interval of the time frame, storing information in the communication device to manage communication in the frequency band using the first and second communication protocols so as to prevent collisions between transmissions of time slots according to the second communication protocol with a time frame according to the first communication protocol.

104. The method of claim 103, wherein the step of storing information comprises building a table having an entry at least for each time slot of the second communication protocol that overlaps in time with the time frame according to the first communication protocol, and storing a distinguishing value in the table for those time slots that have been determined to at least partially overlap in frequency with the frequency of the time frame and with the particular time interval of the time frame according to the first communication protocol.

105. The method of claim 104, and further comprising a step of determining whether information scheduled for transmission in a time slot is synchronous type data or asynchronous type data.

106. The method of claim 105, wherein the step of storing comprises storing a value in the table for one or more time slots which (1) are determined to overlap in frequency with the frequency of the time frame, (2) are determined to overlap in time with the particular time interval of the time frame, and (3) are scheduled for transmission of asynchronous type data, wherein the value indicates that transmission of the one or more time slots according to the second communication protocol is inhibited in favor of transmission of information in the time interval of the time frame according to the first communication protocol.

107. The method of claim 105, wherein for one or more time slots which are (1) determined to overlap in frequency with the frequency of the time frame, (2) determined to overlap in time with the particular time interval of the time frame, and (3) scheduled for transmission of synchronous type data, the step of storing comprises storing information to indicate that transmission of information in the particular time interval of the time frame according to the first communication protocol is inhibited in favor of transmission of the one or more time slots according to the second communication protocol.

108. The method of claim 103, wherein the step of storing is performed in advance of each time frame to build the table for all time slots that overlap in time with each time frame prior to the scheduled occurrence of each time frame.

109. The method of claim 103, wherein prior to the scheduled transmission of each time slot, further comprising a step of reading a value from the table corresponding to each time slot to determine whether to permit or inhibit transmission of information during that time slot.

110. The method of claim 103, wherein the particular time interval of the time frame of information to be transmitted using the first communication protocol comprises first and second contention free time intervals separated in time, wherein the first contention free time interval occurs prior in time to the second contention free time interval in a time frame, and wherein the second contention free time interval is dedicated to communication of synchronous type data in a time frame and the first contention free time interval is dedicated to retransmission of synchronous type data that was transmitted during a second contention free time interval of a preceding time frame, and wherein the step of identifying comprises identifying those time slots determined to at least partially overlap in time with either the first contention free time interval or the second contention free time interval, and at least partially overlap in frequency with the frequency of the time frame.

111. The method of claim 110, wherein the step of storing comprises storing a value for one or more time slots determined to (1) contain asynchronous type data, (2) at least partially overlap in time with the first contention free time interval or with the second contention free time interval, and (3) at least partially overlap in frequency with the frequency of the time frame, wherein the value indicates that transmission of the one or more time slots according to the second communication protocol is inhibited in favor of transmission of information in the time interval of the time frame according to the first communication protocol.

112. The method of claim 110, wherein for one or more time slots determined to (1) contain synchronous type data, (2) at least partially overlap in time with the first contention free time interval, and (3) at least partially overlap in frequency with the frequency of the time frame, the step of storing comprises storing information that results in alternating priority between transmission of the one or more time slots and transmission of the first contention free time interval with respect to similar collisions that occurred in prior time frames and similar collisions that may occur in future time frames.

113. The method of claim 110, wherein for one or more time slots determined to (1) contain synchronous type data, (2) at least partially overlap in time with the first contention free time interval, and (3) at least partially overlap in frequency with the frequency of the time frame, the step of storing comprises setting values for timing of various time intervals in the time frame so as to prevent the contention free time interval from overlapping in time with the one or more time slots scheduled to transmit synchronous data.

114. The method of claim 110, wherein for one or more time slots determined to (1) contain synchronous type data, (2) at least partially overlap in time with the first contention free time interval, and (3) at least partially overlap in frequency with the frequency of the time frame, the step of storing comprises setting values to insert one or more non-information bearing time segments in the time frame to move the contention free time interval to a position in the time frame that does not overlap in time with the one or more time slots scheduled to transmit synchronous data.

115. The method of claim 114, wherein for one or more time slots determined to (1) contain synchronous type data, (2) at least partially overlap in time with the first contention free time interval, and (3) at least partially overlap in frequency with the frequency of the time frame, if it is determined that it is not possible move the first contention free time interval away from the one or more time slots that are scheduled to transmit synchronous data, then further comprising the step of alternating priority between transmission of the one or more time slots and transmission of the first contention free time interval with respect to similar collisions that occurred in prior time frames and similar collisions that may occur in future time frames.

116. The method of claim 110, wherein for one or more time slots determined to (1) contain synchronous type data, (2) at least partially overlap in time with the second contention free time interval, and (3) at least partially overlap in frequency with the frequency of the time frame, the step of storing comprises setting values for time intervals of the time frame so as to decommission or eliminate the second contention free time interval of that time frame.

117. The method of claim 103, wherein the time frame of information according to the first communication protocol uses at least one contention time interval during which communication devices using the first communication protocol in the frequency band contend for access to transmit information using carrier sense multiple access procedures, and further comprising the step of determining whether a time slot of information to be transmitted using the second communication protocol will at least partially overlap with the contention time interval and is scheduled to transmit synchronous data.

118. The method of claim 117, wherein when it is determined that the time slot of information to be transmitted using the second communication protocol will at least partially overlap with the contention time interval and is scheduled to transmit synchronous data, further comprising the step of transmitting a guard packet from the communication device in accordance with the first communication protocol, the guard packet being formatted to alert and inform communication devices that use the first communication protocol to refrain from communication for a period of time in the frequency band to enable transmission of information from, or reception of information by, the communication device in accordance with the second communication protocol during the period of time without colliding with signals in the frequency band on the first communication protocol.

119. A controller for use in a wireless communication device that controls communication among a plurality of wireless communication devices in a frequency band in which communication between communication devices concurrently occurs using first and second communication protocols, wherein communication using the first communication protocol occurs during a plurality of time frames each of which includes a plurality of time intervals each of a variable time duration and dedicated to functions determined by rules of the first communication protocol, a particular time interval in a time frame being dedicated for communication of synchronous type data, and wherein each time frame is transmitted at a different frequency in the band, and wherein the second communication protocol uses a frequency that changes for each of a plurality of time slots of information that are transmitted in the frequency band and wherein predetermined ones of the time slots are allocated for communication of synchronous type data, the controller being configured or programmed for preventing transmission of information in a time frame according to the first communication protocol from colliding with transmissions of time slots of information using the second communication protocol, by performing steps of:
 prior to a scheduled transmission of at least one time frame of information using the first communication protocol and to transmissions of a corresponding plurality of time slots using the second communication protocol,
 determining whether any of the plurality of time slots to be transmitted using the second communication protocol at least partially overlap in time with said particular time interval in the time frame;
 identifying those time slots to be transmitted using the second communication protocol that at least partially overlap with said particular time interval of the time frame;
 determining frequencies for each of the plurality of time slots to be transmitted using the second communication protocol;
 for each time slot whose frequency will at least partially overlap with a frequency of the time frame and will at least partially overlap in time with said particular time interval of the time frame, storing information in the communication device to manage communication in the frequency band using the first and second communication protocols so as to prevent collisions between transmissions of time slots according to the second communication protocol with a time frame according to the first communication protocol.

120. A software product stored on a processor readable memory containing instructions that, when executed by a processor, causes the processor to perform steps of:
 prior to a scheduled transmission of at least one time frame of information using a first communication protocol and to transmissions of a plurality of time slots using a second communication protocol, wherein communication using the first communication protocol occurs during a plurality of time frames each of which includes a plurality of time intervals each of a variable time duration and dedicated to functions determined by rules of the first communication protocol, a particular time interval in a time frame being dedicated for communication of synchronous type data, and wherein each time frame is transmitted at a different frequency in the band, and wherein the second communication protocol uses a frequency that changes for each of a plurality of time slots of information that are transmitted in the frequency band and wherein predetermined ones of the time slots are allocated for communication of synchronous type data;
 determining whether any of the plurality of time slots to be transmitted using the second communication protocol at least partially overlap in time with the particular time interval in the time frame;
 identifying those time slots to be transmitted using the second communication protocol that at least partially overlap in time with the particular time interval of the time frame;
 determining frequencies for each of the plurality of time slots to be transmitted using the second communication protocol;
 for each time slot whose frequency will at least partially overlap with a frequency of the time frame, will at least partially overlap in time with the particular time interval of the time frame, storing information to manage communication in the frequency band using the first and second communication protocols so as to prevent collisions between transmissions of time slots according to the second communication protocol with a time frame according to the first communication protocol.

121. A method for controlling communication among a plurality of wireless communication devices in a common frequency band in which communication between communication devices occurs using first and second communication protocols, wherein communication using the first communication protocol occurs during a plurality of time frames each of which includes a plurality of time intervals dedicated to functions determined by rules of the first communication protocol, a particular time interval in the time frame being dedicated to assigning the start time and duration of subsequent time intervals in the time frame, and wherein each time frame is transmitted at a different frequency in the band, and wherein the second communication protocol uses a frequency that changes for each of a plurality of time slots of information that are transmitted in the frequency band, wherein each time slot is separated by a silent time period, in a communication device capable of communicating using the first and second communication protocols a method for preventing transmission of information according to the second communication protocol from colliding with the beacon time interval, comprising steps of:

generating from a common clock signal a first clock signal used to synchronize transmission of the time frames for the first communication protocol and a second clock signal used to synchronize the time slots for the second communication protocol; and scheduling transmission of time frames of the first communication protocol with respect to the first clock signal and transmission of time slots of the second communication protocol with respect to the second clock signal so as to guarantee that the particular time interval of a time frame in the first communication protocol is occurs during a silent time period between time slots of the second communication protocol.

122. The method of claim 121, wherein the step of generating the first and second clock signals comprises separately frequency dividing the common clock signal to generate first and second divided signals, and phase aligning rising edges of the first and second divided signals such that the rising edge of the first clock signal occurs a predetermined period of after the rising edge of the second clock signal.

123. The method of claim 122, wherein the step of scheduling comprises aligning a transmission of the particular time interval of a time frame according to the first communication protocol at the rising edge of the first clock signal and aligning transmission of a time slot according to the second communication protocol at the rising edge of the second clock signal.

124. The method of claim 123, wherein the predetermined period of time comprises a period of time at least equal to a duration of a data portion of a time slot according to the second communication protocol.

125. A method for enabling concurrent transmission of a first signal and reception of a second signal which at least partially overlap in frequency at a wireless communication device without substantial interference between the signals and degradation thereof, the first signal having a wide frequency bandwidth relative to that of the second signal, the method comprising steps of:

filtering out from the first signal a portion of its frequency bandwidth to generate a filtered signal, whereby a frequency location and bandwidth of the second signal coincides with the portion of the frequency bandwidth filtered out from the first signal;

transmitting the filtered signal;

receiving the second signal at the wireless communication device concurrent with the transmission of the filtered signal;

adding the filtered signal to the second signal to generate a composite signal; and filtering the composite signal to eliminate all but a portion corresponding to the frequency location and bandwidth of the second signal thereby recovering the second signal.

126. The method of claim 125, wherein when a duration of the second signal is shorter than a duration of the first signal, further comprising a step of allpass filtering the composite signal with a group delay which is the same as a group delay used in the first filtering step.

127. The method of claim 125, wherein the first signal is a signal centered around a fixed frequency, and wherein the second signal is a time slot of information of a plurality of time slots, each transmitted at a different frequency.

128. The method of claim 127, wherein the first signal is a signal according to the IEEE 802.11 wireless communication protocol standard and versions thereof, and the second signal is a signal according to the Bluetooth™ wireless communication protocol standard, and versions thereof.

129. A method for enabling concurrent transmission of a first signal and reception of a second signal which at least partially overlap in frequency at a wireless communication device without substantial interference between the signals and degradation thereof, the second signal having a wide frequency bandwidth relative to that of the first signal, the method comprising steps of:

transmitting the first signal from the wireless communication device;

receiving the second signal at the wireless communication device concurrent with the transmission of the first signal;

adding the first signal and the second signal together to form a composite signal;

filtering the composite signal to remove a portion of a bandwidth of the composite signal corresponding to a frequency location and bandwidth of the first signal, thereby recovering the second signal.

130. The method of claim 129, wherein when a duration of the first signal is shorter than a duration of the second signal, further comprising a step of allpass filtering the composite signal with a group delay which is the same as a group delay used in the filtering step.

131. The method of claim 129, wherein the first signal is a time slot of information of a plurality of time slots, each transmitted at a different frequency, and the first signal is a signal centered around a fixed frequency.

132. The method of claim 131, wherein the first signal is a signal according to the Bluetooth™ wireless communication protocol standard, and versions thereof, and the second signal is a signal according to the IEEE 802.11 wireless communication protocol standard and versions thereof.

* * * * *